United States Patent
Ilzuka et al.

(10) Patent No.: US 7,730,488 B2
(45) Date of Patent: Jun. 1, 2010

(54) COMPUTER RESOURCE MANAGEMENT METHOD IN DISTRIBUTED PROCESSING SYSTEM

(75) Inventors: Daisuke Ilzuka, Yokohama (JP); Yutaka Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1377 days.

(21) Appl. No.: 11/064,959

(22) Filed: Feb. 25, 2005

(65) Prior Publication Data
US 2006/0178848 A1    Aug. 10, 2006

(30) Foreign Application Priority Data
Feb. 10, 2005  (JP) .............................. 2005-033777

(51) Int. Cl.
*G06F 9/46* (2006.01)
(52) U.S. Cl. ........................ 718/102; 718/104; 709/201; 709/223; 709/226; 709/229
(58) Field of Classification Search ................. 718/104, 718/105, 102; 709/201, 223, 226, 229
See application file for complete search history.

(56) References Cited

U.S. PATENT DOCUMENTS 7,526,767 B1 * 4/2009 Rhee et al. .................. 718/104

2001/0044817 A1 * 11/2001 Asano et al. ................. 709/100
2003/0158884 A1 *  8/2003 Alford, Jr. .................... 709/104
2006/0010449 A1 *  1/2006 Flower et al. ............... 718/102

FOREIGN PATENT DOCUMENTS

JP          2002-24194          1/2002

* cited by examiner

*Primary Examiner*—Andy Ho
(74) *Attorney, Agent, or Firm*—Brundidge & Stanger, P.C.

(57) ABSTRACT

The hardware information showing a type of hardware constituting the computer resource and the software information showing a type of software mounted in the computer resource are stored in the entry corresponding to each computer resource in the computer configuration table managed by a management computer. Further, when a computer resource allocated to a certain job is determined, a computer resource which may be used for the job in the aftertime is selected with reference to the hardware information and the software information, and the job name is registered as a tentatively booked job name in the entry corresponding to the selected computer resource in the computer configuration table. When additionally allocating the computer resource, the computer resource which is tentatively booked is selected with priority, and the computer resource tentatively booked to another job is excluded from the additional allocation.

14 Claims, 18 Drawing Sheets

COMPUTER RESOURCE MANAGEMENT METHOD IN DISTRIBUTED PROCESSING SYSTEM

CROSS-REFERENCE TO RELATED APPLICATION

The present application claims priority from Japanese Patent Application JP 2005-33777 filed on, Feb. 10, 2005, the content of which is hereby incorporated by reference into this application.

TECHNICAL FIELD OF THE INVENTION

The present invention relates to a distributed processing system in which a job for providing clients with the same kind of service via network is distributed to and processed by a plurality of computer resources under the control of a management computer. More particularly, it relates to a technique effectively applied to a system for determining the computer group which operates a network application for providing a service via a network and to a configuration management system which installs an optional application into an optional computer and operates the application under the control of a configuration management machine.

BACKGROUND OF THE INVENTION

In the Web tier of a Web-based three-tier application, usually, a plurality of computer resources equipped with the same application are prepared, and access requests for the service provided by the application are distributed to the plurality of computer resources by using a load distribution device and processed therein. In this distributed processing system, when the processing speed for the service is reduced due to the increase of the requests, a computer equipped with the same application is newly added and the settings of the load distribution device are changed so as to distribute the request also to the added computer. By doing so, the reduction of processing speed for the service can be avoided.

Japanese Patent Application Laid-Open No. 2002-24194 discloses the distribution of jobs with reference to the history of the jobs executed by the computer resources.

SUMMARY OF THE INVENTION

In the conventional technology, a type of computer different from those used so far is added in some cases. In the case where the load is distributed to various types of computers, since the processing power differs in each of the computers, the processing speed of the request allocated to the computer with lower processing power is reduced when the requests are uniformly allocated to all of the computers by the load distribution device. Also, in the system where the requests are uniformly allocated to the computers by the load distribution device, if all of the computers have the uniform performance, the load factor is almost equal in all computers. Therefore, the timing for adding a new computer due to the overload can be determined by measuring the load factor of only one computer. Meanwhile, if the performance thereof is not uniform, the load factor is not equal in the computers. Therefore, it becomes difficult to determine the timing for adding a new computer due to the overload. An object of the present invention is to solve the problem described above.

According to an embodiment of the present invention, hardware information showing the type of the hardware constituting a computer resource and software information showing the type of software mounted in the computer resource are stored in the entry corresponding to each computer resource in a computer configuration table managed by the management computer. Furthermore, when a computer resource to be allocated to a certain job is determined, a computer resource that may be used for the job in the aftertime is selected and the job name is stored in the entry corresponding to the selected computer resource in the computer configuration table. More specifically, in addition to computer resources actually allocated to a job, a computer resource tentatively booked to be used for the job in the aftertime is provided. When it becomes necessary to additionally allocate a computer to the job, the tentatively booked computer resource is additionally allocated. If there is no computer resource tentatively booked for the job, a computer resource not booked for another job is allocated with priority. If a computer resource to be tentatively booked for a job is selected under the condition that it must have the same hardware type and software type as those of the computer resources allocated to the job, the computer resources which share the same job have uniform performance.

In the case where a plurality of computer resources have been already allocated and operated for a job, a resource equalization processing for exchanging a part of the allocated computer resources with other suitable computer resources is executed regularly. In this resource equalization processing, a "majority computer resource group" including the computer resources each having the same hardware type and software type is extracted from a plurality of computer resources used for one job, computer resources which have the same hardware information and software information as those of the majority computer resource group are selected from the computer resources not allocated to any job or from a minority group of the computer resources used for a different job, and the job allocation is exchanged between the computer resources other than the majority computer resource group of the plurality of computer resources used for the one job and the selected computer resources.

According to the present invention, the performance of the computer resources which share the same job can be equalized. Therefore, the timing for providing an additional computer can be easily determined by detecting the overload.

BRIEF DESCRIPTIONS OF THE DRAWINGS

Figure 15:
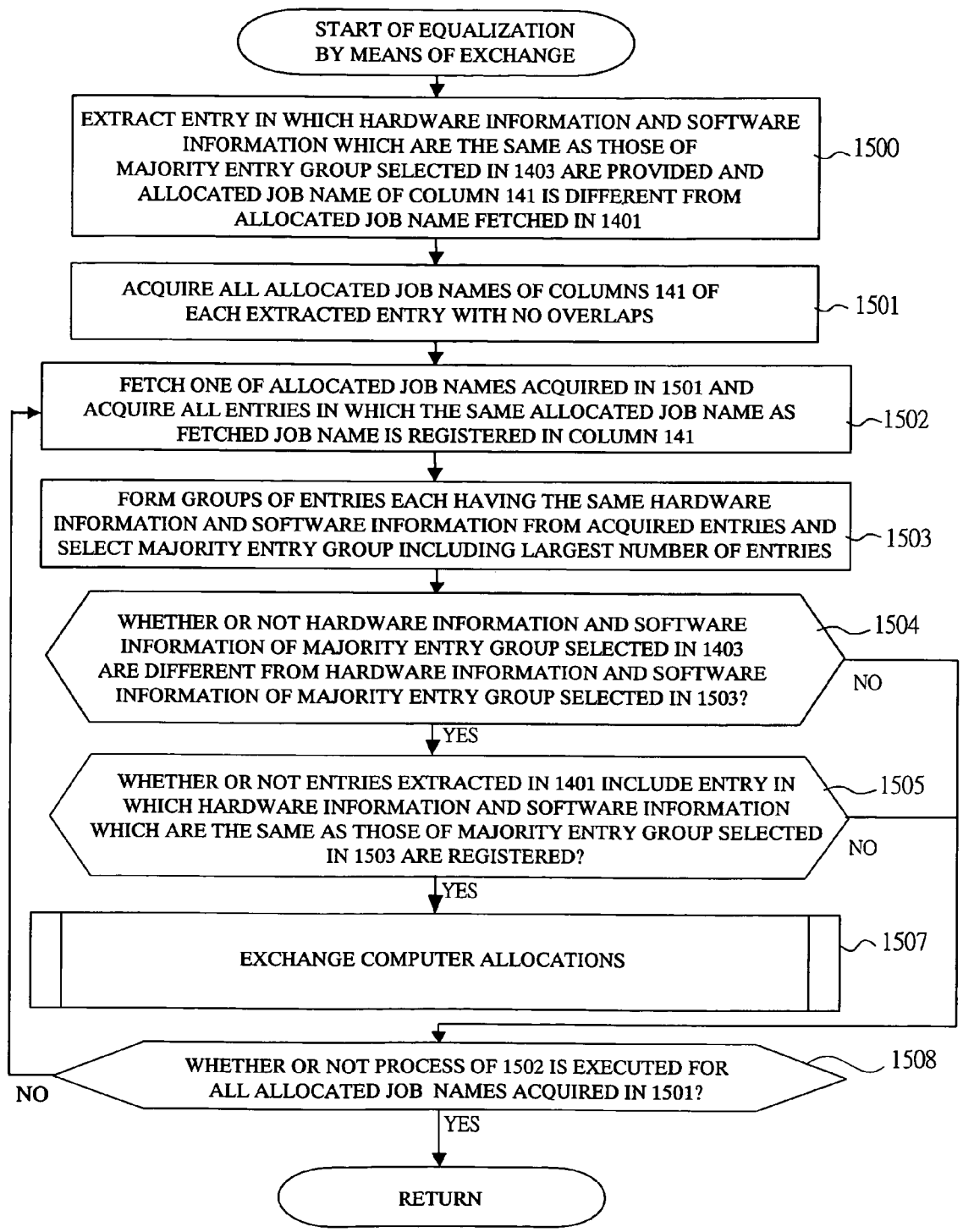
Figure 16:
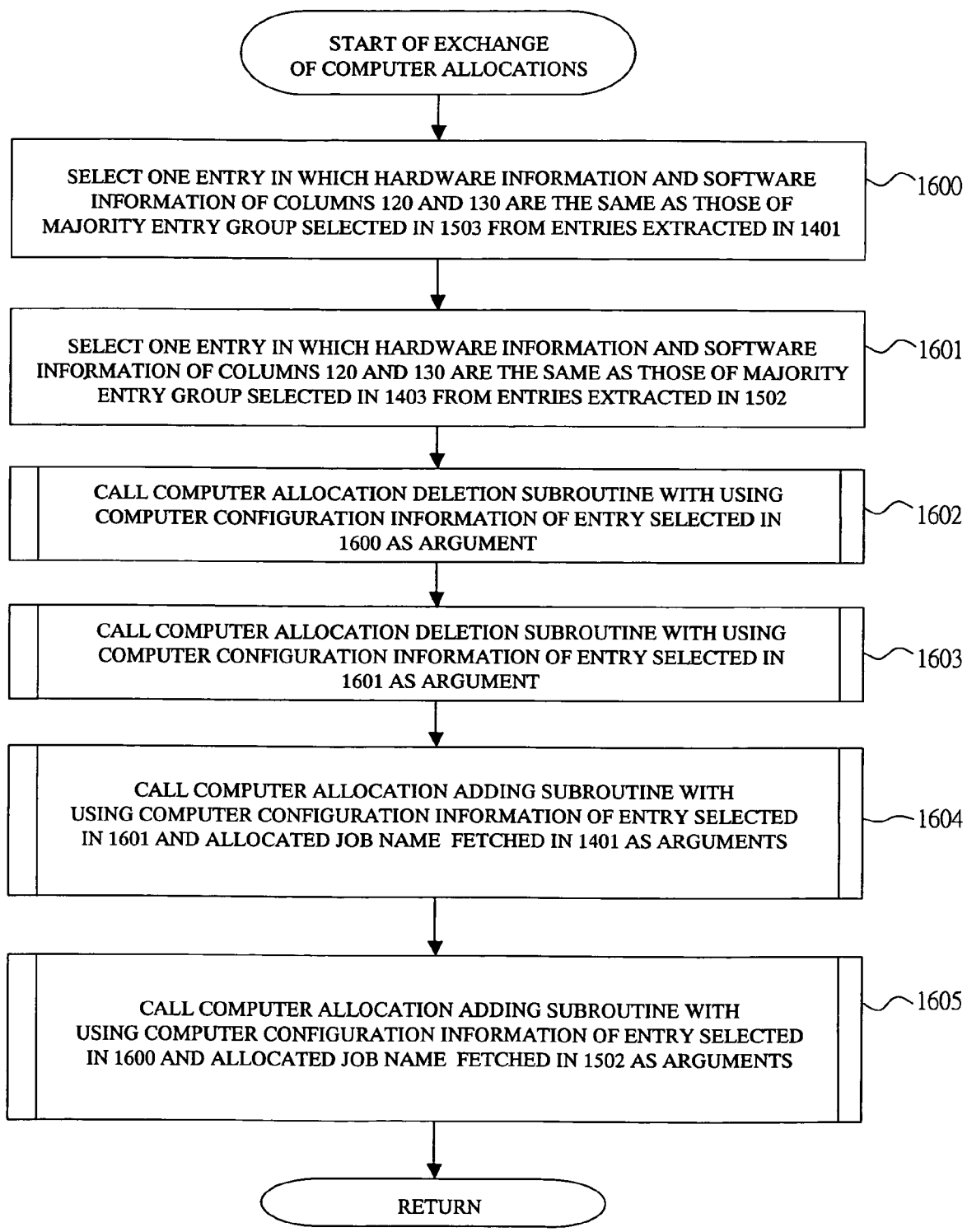
Figure 17:
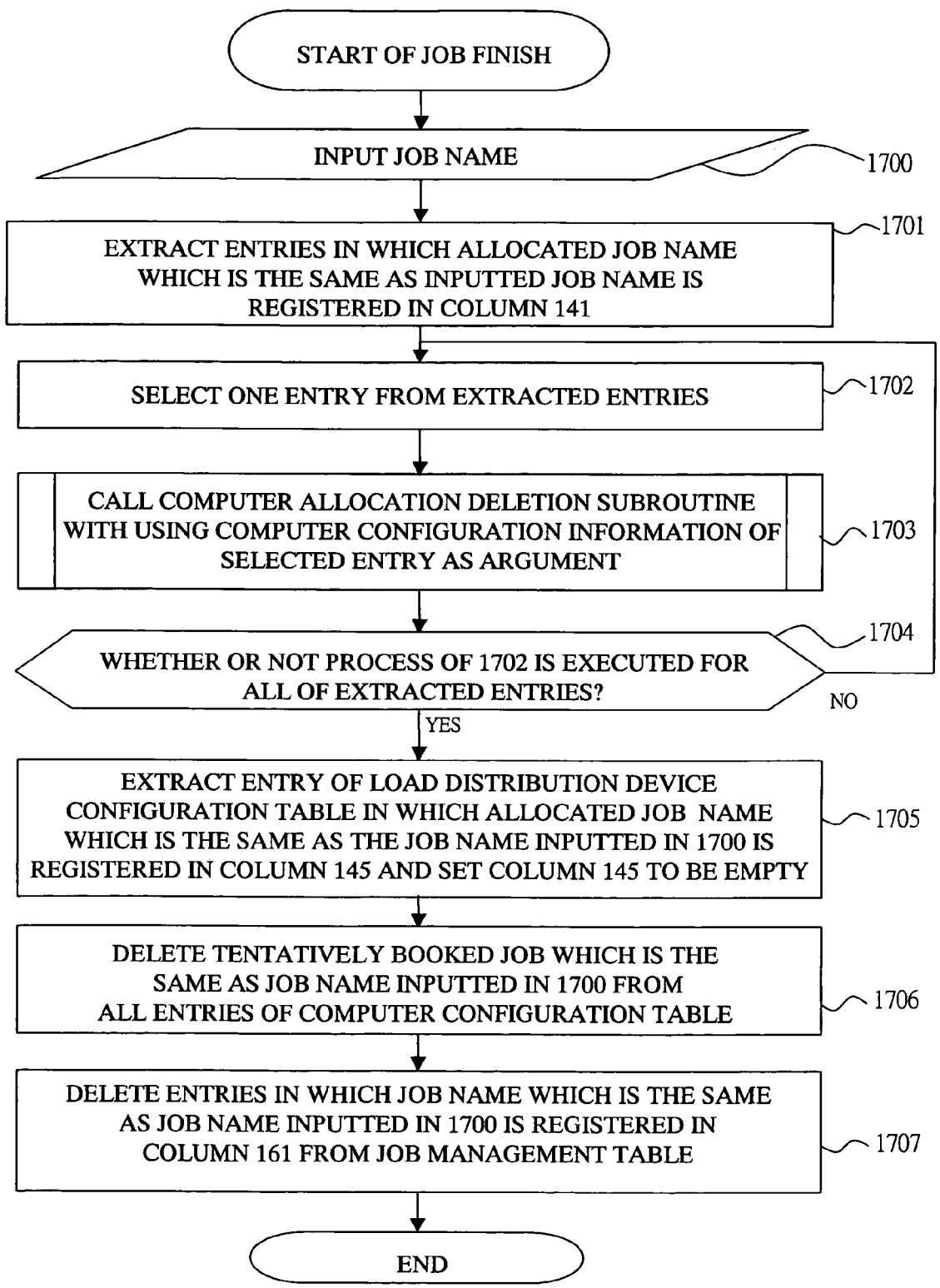
Figure 18:
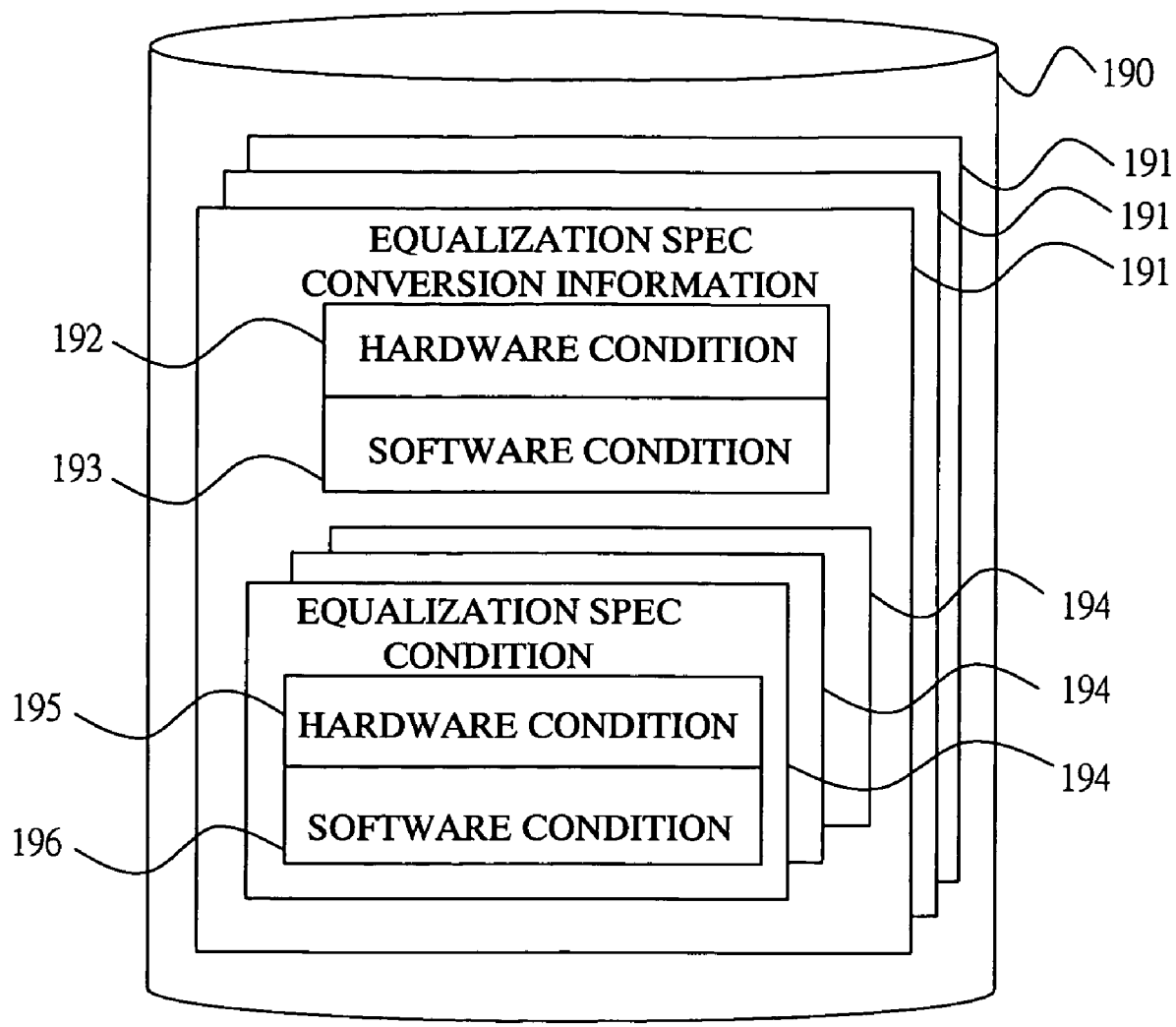
Figure 19:
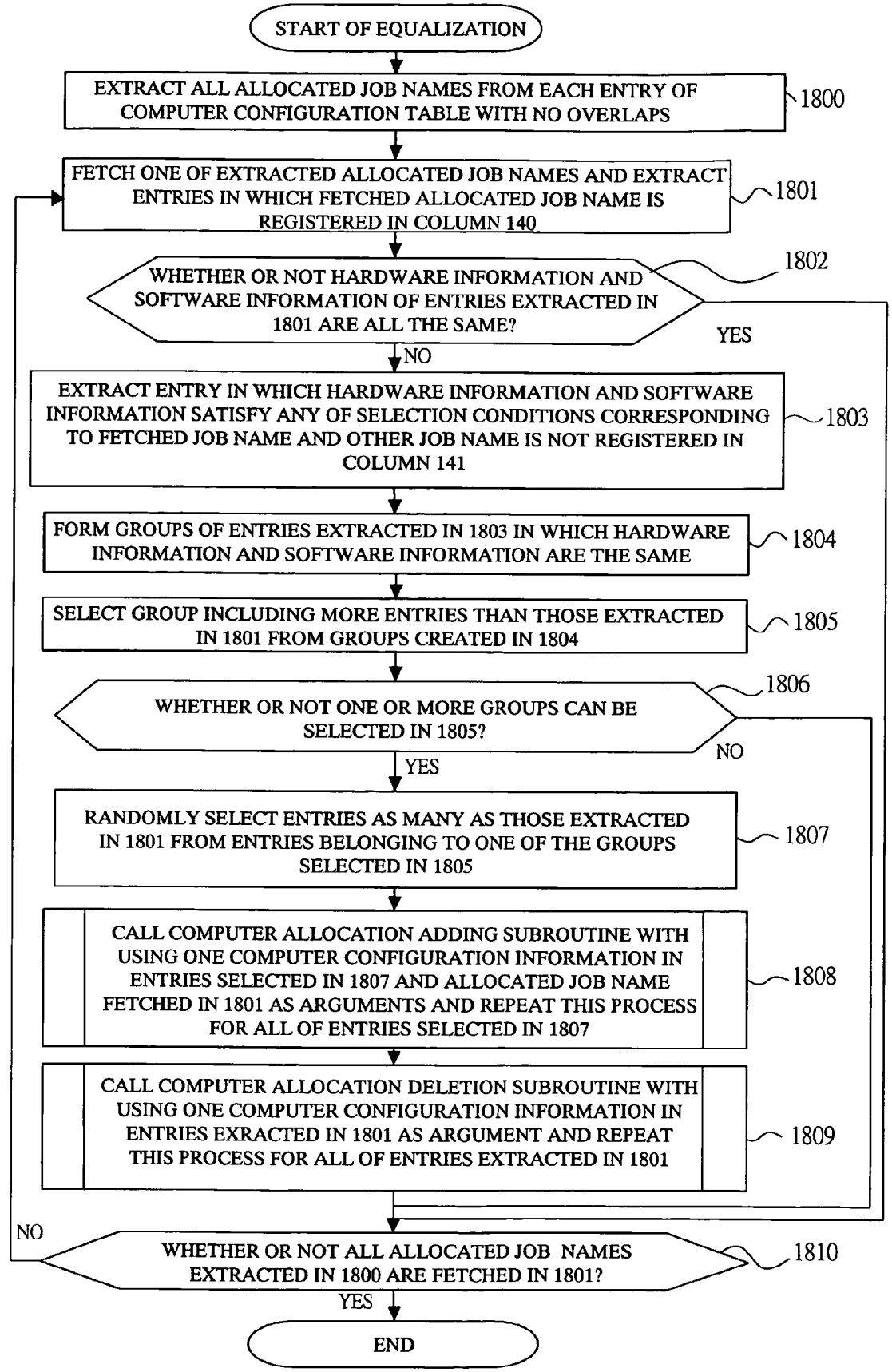

FIG. 15 a flowchart showing the equalization process by means of exchange executed in the first embodiment;

FIG. 16 is a flowchart showing a part of the equalization process by means of exchange in detail;

FIG. 17 is a flowchart showing the process of the job finish program according to the first embodiment;

FIG. 18 is a diagram showing the configuration of the equalization spec conversion information storing region 190 according to the second embodiment of the present invention; and FIG. 19 is a flowchart showing the simultaneous switching process executed in another embodiment of the present invention.

DESCRIPTIONS OF THE PREFERRED EMBODIMENTS

First Embodiment

An embodiment in which the present invention is applied to a distributed processing system that constitutes a data center will be described below.

Figure 1:
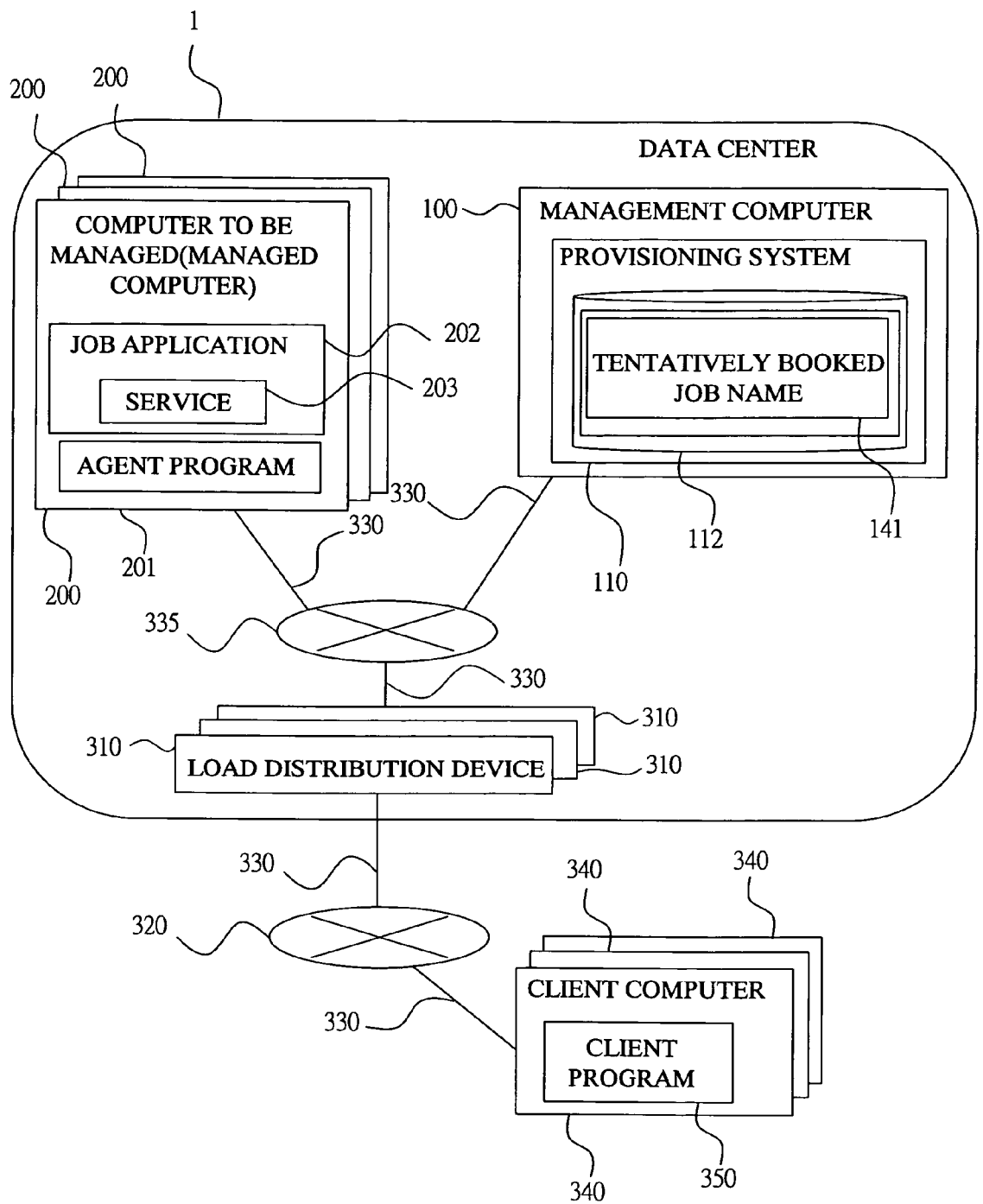
FIG. 1 is a block diagram showing the network configuration in a distributed processing system according to the first embodiment of the present invention.

FIG. 1 is a diagram showing system configuration according to this embodiment. A data center 1 and a plurality of client computers 340 are connected via the Internet 320. Load distribution devices 310 in the data center 1 and the client computers 340 outside the data center 1 are connected to the Internet 320 via a network cable 330 so as to communicate with each other.

A client program 350 is operated on the client computer 340. The client program 350 accesses a service 203 provided by a job application 202 operated on a computer to be managed (hereinafter, also referred to as a managed computer) 200 in the data center 1 via the Internet 320 and the load distribution device 310 in the data center 1, and uses the service.

A management computer 100, a plurality of managed computers 200, a plurality of load distribution devices 310 are provided in the data center 1, and each of them is connected via the network cable 330 and a network switch 335 so as to communicate with each other. An agent program 201 is operated on each of the managed computers 200.

The management computer 100 has a function to manage all of the managed computers 200 in the data center 1. A provisioning system 110 is operated in the management computer 100. In a configuration management information storing region 112 in the provisioning system 110, configuration information of each of the managed computers 200 is stored. As one item of the configuration information, a tentatively booked job name 141 is provided. The contents of the configuration management information storing region 112 will be described later in detail. Also, the provisioning system 110 has a function to install or uninstall an optional application to or from the managed computer 200 on which the agent program 201 is operated and a function to execute or stop the installed application in cooperation with the agent program 201 operated on an optional managed computer 200. Also, the agent program 201 has a function to send a load distribution start event to the provisioning system when the state where the CPU utilization of the managed computer 200 on which the agent program 201 is operated reaches 100% is maintained for a predetermined time.

Figure 2:
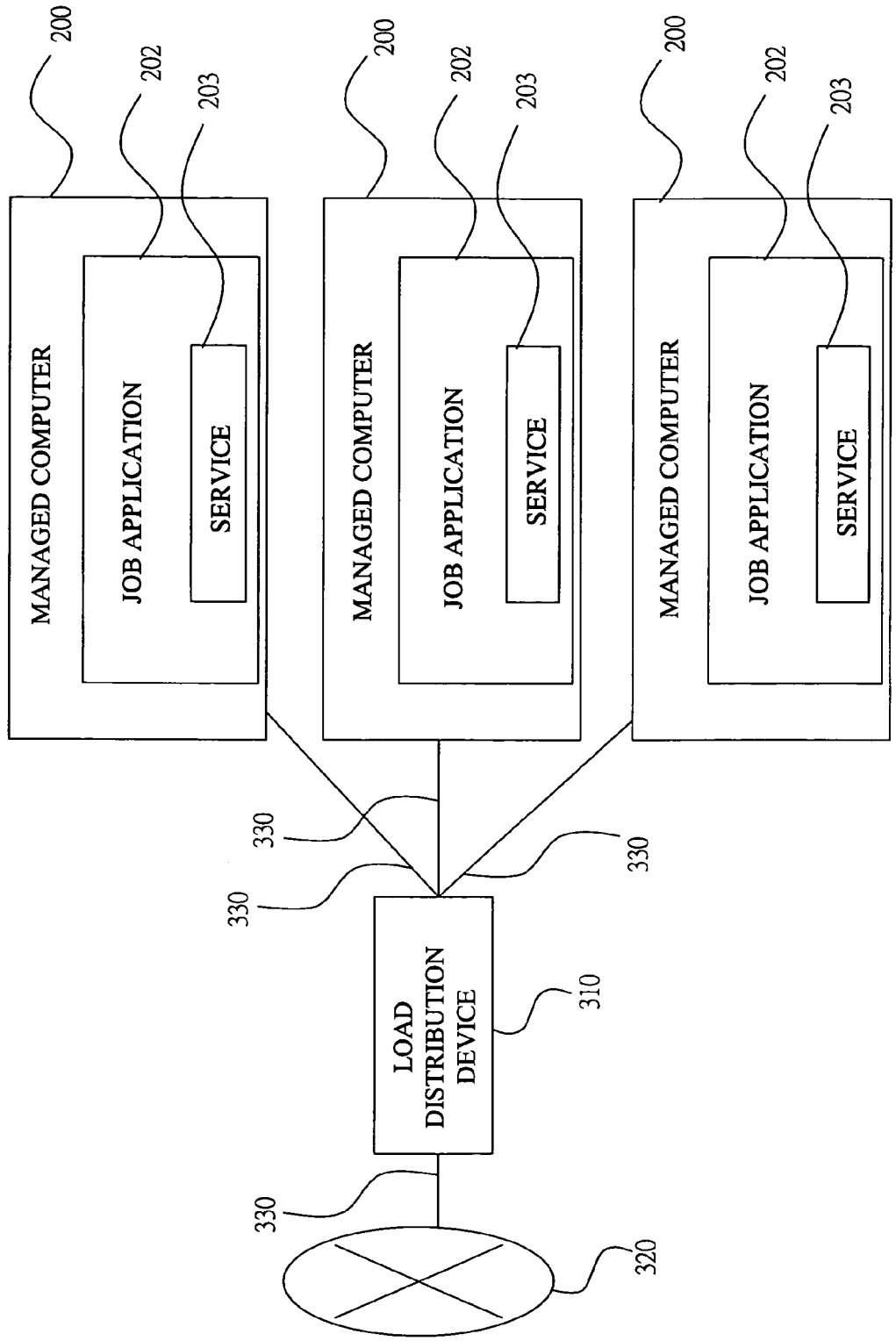
FIG. 2 is a diagram showing the resources used for one job according to the first embodiment.

FIG. 2 is a diagram showing the resources in the data center 1 used in the case where one job for providing a service 203 is operated in the data center 1. In FIG. 2, three managed computers 200 are used. When an access request for the service 203 is transmitted from the client computer 340 to the load distribution device 310 via the Internet 320, the load distribution device 310 distributes the access request to each of the three managed computers 200 in a round robbin manner. When the processing power becomes insufficient, the number of managed computers 200 is increased. Since the load of the service 203 is distributed by using the load distribution device 310, it is possible to provide the service 203 without reducing the access latency and the throughput even when the number of access requests is increased.

Figure 3:
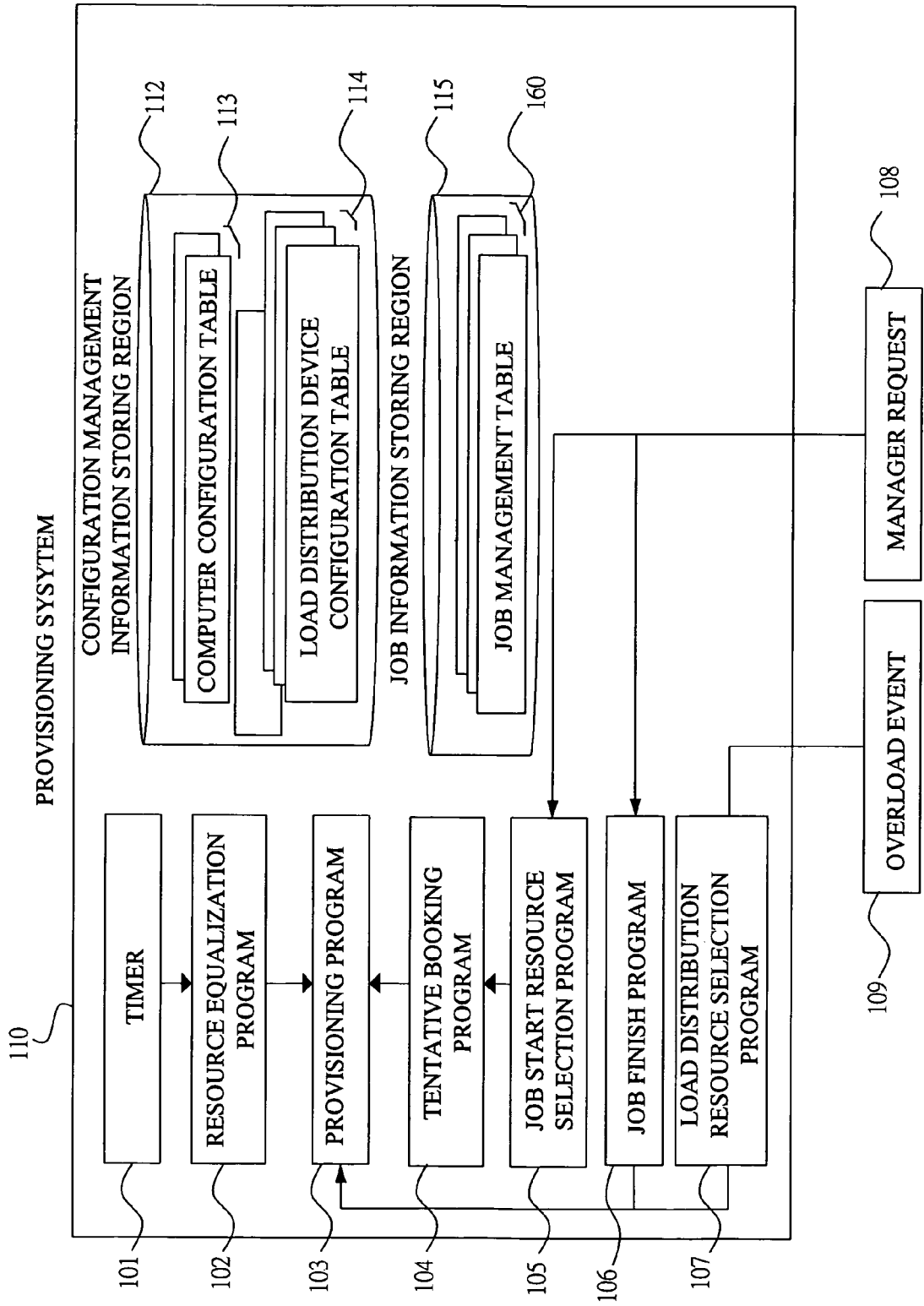
FIG. 3 is a diagram showing the configuration of the provisioning system according to the first embodiment.

FIG. 3 is a diagram showing the configuration of the provisioning system 110 according to this embodiment. The provisioning system 110 is comprised of: a timer 101; a resource equalization program 102; a provisioning program 103; a tentative booking program 104; a job start resource selection program 105; a job finish program 106; and a load distribution resource selection program 107.

The manager of the data center 1 creates configuration information of all of the managed computers 200, and stores the created configuration information in the configuration management information storing region 112 in advance. Similarly, the manager of the data center 1 creates configuration information of all of the load distribution devices 310, and stores the created configuration information in the configuration management information storing region 112 in advance. More specifically, a computer configuration table 113 having entries corresponding to each of the managed computers 200 and a load distribution device configuration table 114 having entries corresponding to each of the load distribution devices 310 are stored in the configuration management information storing region 112. The information concerning the job currently operated by using the managed computer 200 and the load distribution device 310 in the data center 1 is stored in a job information storing region 115. Therefore, a job management table 160 having entries corresponding to each of the currently operated jobs is stored in the job information storing region 115.

The job start resource selection program 105 is activated by a manager request 108 and executes the process for determining the managed computer resource and the load distribution device 310 to be used for the job. The tentative booking program 104 executes the process which makes it possible to add the managed computer 200 having the same hardware and software as those of the managed computers 200 already used for the job when distributing the load for the job. The job finish program 106 is activated by the manager request 108 and executes the process for finishing the job. The load distribution resource selection program 107 is activated by an overload event 109 and executes the process for selecting the managed computer 200 having the same hardware and software as those of the managed computer 200 already used for the job with priority when distributing the load for the job. The overload event 109 is sent from the managed computer to the provisioning system 110 when the load on the managed computer 200 operating the job reaches a predetermined value or more. The timer 101 executes the process for activating the resource equalization program at certain intervals. The resource equalization program 102 executes the process for increasing the number of computer resources having the same hardware and software in all of the managed computer resources used for the job currently operated in the data center 1. The provisioning program 103 executes the processes of network setting and installation, activation, stop, and uninstallation of job application for the designated computer resource and executes the process for setting the load distribution destination for the designated load distribution device 310.

Figure 4:
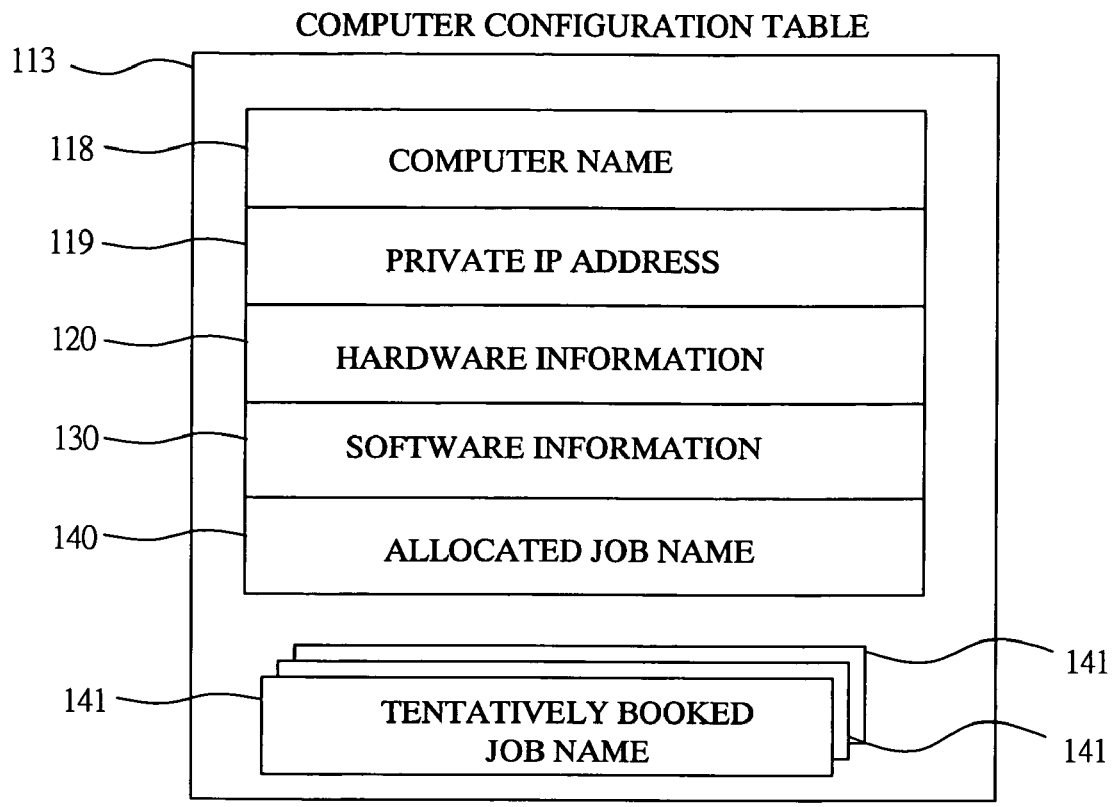
FIG. 4 is a diagram showing the configuration of the computer configuration table according to the first embodiment.

FIG. 4 is a diagram showing the configuration of each entry in the computer configuration table 113 according to this embodiment. Each entry in the computer configuration table 113 is comprised of columns 118 to 141. The column 118 stores a computer name which is the name of the managed computer 200 corresponding to the entry. The computer name is also used for identifying the entry in the computer configuration table 113. The column 119 stores an IP address set in the network interface of the managed computer 200 corresponding to the entry. The column 120 stores hardware information of the corresponding managed computer 200. The column 130 stores software information which shows the software installed in the corresponding managed computer 200. The column 140 stores a name of the job for which the corresponding managed computer 200 is currently used. If the managed computer 200 corresponding to the entry is not used for any job, the column 140 is empty. The column 141 stores a tentatively booked job name which is the name of the job for which the corresponding managed computer 200 is to be used with priority in the aftertime. It is possible to store a plurality of the tentatively booked job names.

Figure 5:
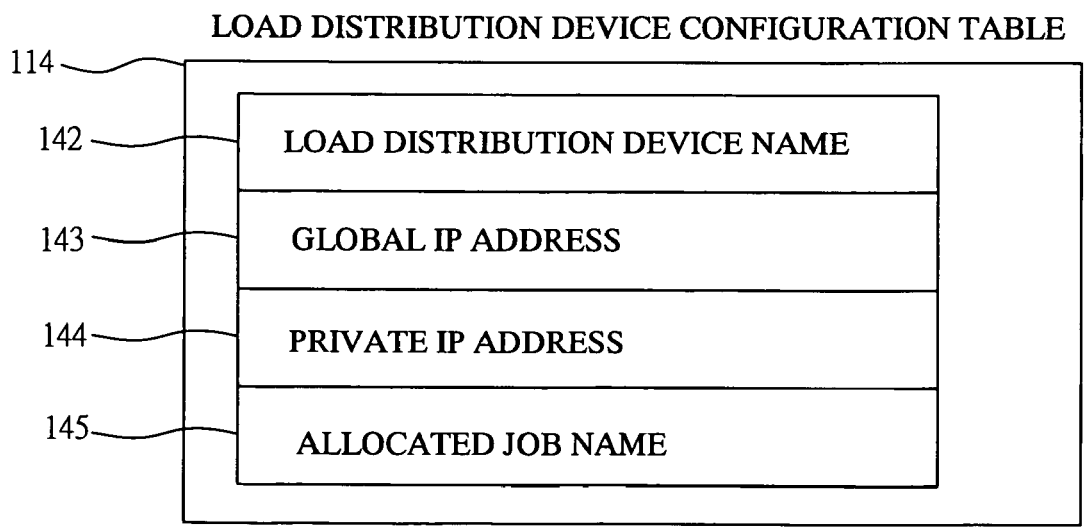
FIG. 5 is a diagram showing the configuration of the load distribution device configuration table according to the first embodiment.

FIG. 5 is a diagram showing the configuration of each entry in the load distribution device configuration table 114 according to this embodiment. Each entry in the load distribution device configuration table 114 is comprised of columns 142 to 145. The column 142 stores a load distribution device name corresponding to the entry. The load distribution device name is also used for identifying each entry in the load distribution device configuration table 114. The column 143 stores a global IP address which is an IP address set to the network interface connected to the Internet 320 of the corresponding load distribution device 310. The column 144 stores a private IP address which is an IP address set to the network interface connected to the network switch 335 of the corresponding load distribution device 310. The column 145 stores a name of the job for which the corresponding load distribution device 310 is currently used. If the load distribution device 310 corresponding to the entry is not used for any job, the column 145 is empty.

Figure 6:
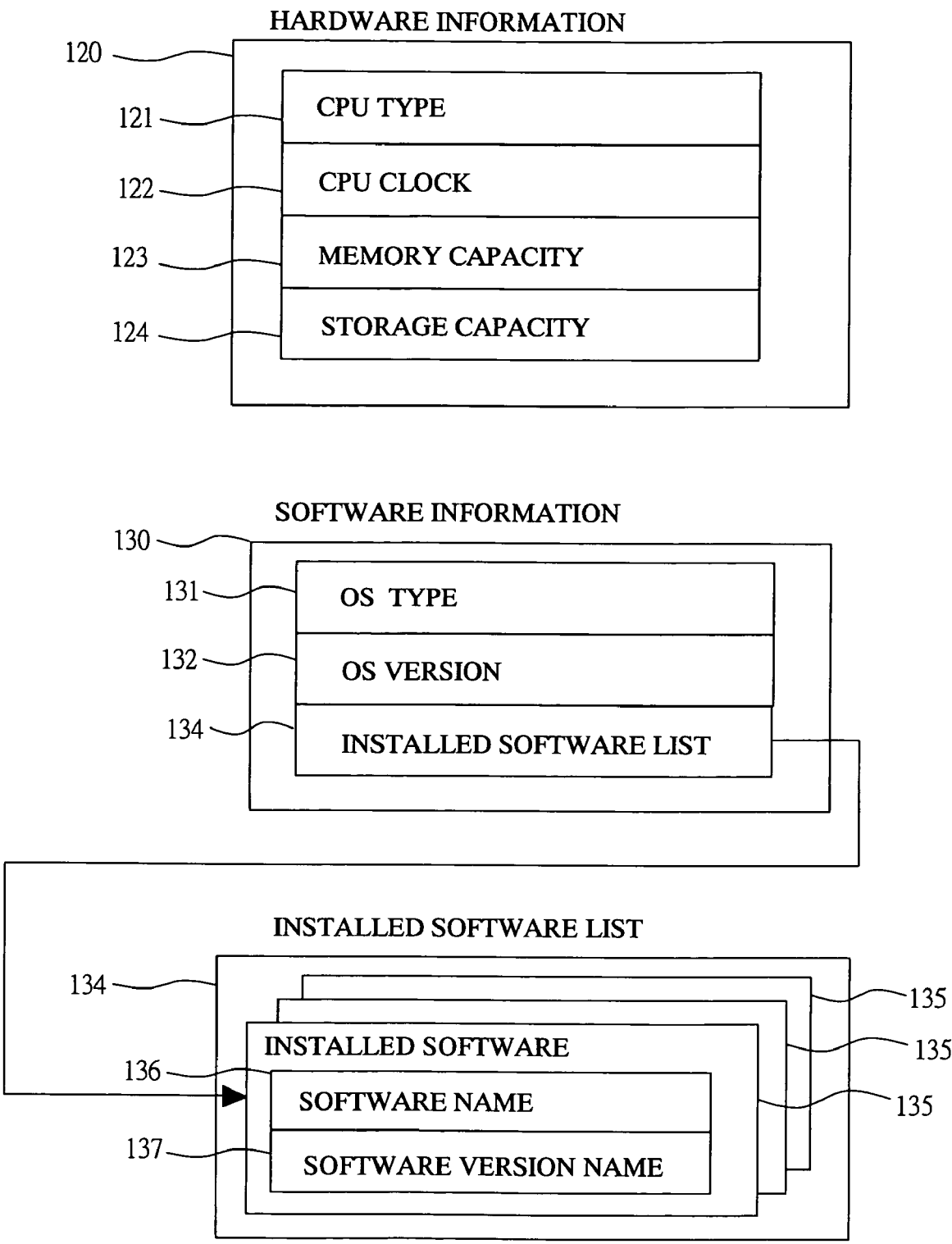
FIG. 6 is a diagram showing the configuration of the hardware information and the software information stored in the computer configuration table according to the first embodiment.

FIG. 6 is a diagram showing the configuration of the hardware information 120 and the software information 130 stored in the computer configuration table 113 according to this embodiment. The hardware information 120 is comprised of a CPU type 121, a CPU clock 122, a memory capacity 123, and a storage capacity 124. The CPU type 121 is the type of the CPU mounted on the managed computer 200 corresponding to the entry in the computer configuration table 113. The CPU clock 122 is the operating frequency of the CPU mounted on the corresponding managed computer 200. The memory capacity 123 is the capacity of physical memory mounted on the corresponding managed computer 200. The storage capacity 124 is the capacity of the storage accessible from the managed computer 200 corresponding to the computer configuration information 113. The software information 130 is comprised of an OS type 131, an OS version 132, and an installed software list 134. The OS type 131 is the type of the OS operated in the corresponding managed computer 200. The OS version 132 is the version name of the OS operated in the corresponding managed computer 200. In the installed software list 134, the information about all softwares installed in the corresponding managed computer 200 is listed, and each software information is comprised of a software name 136 and a software version name 137.

Figure 7:
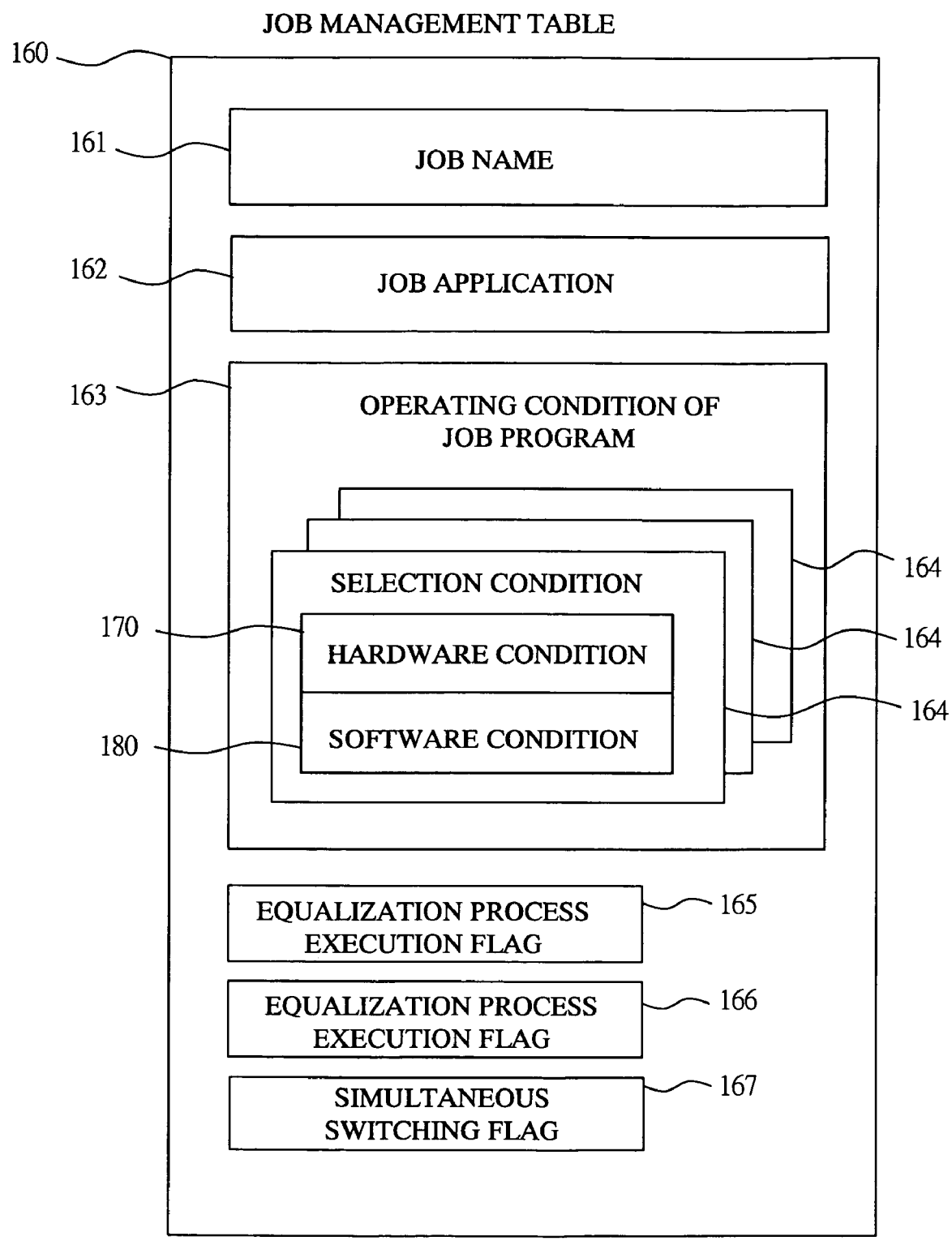
FIG. 7 is a diagram showing the configuration of the job management table according to the first embodiment.

FIG. 7 is a diagram showing the configuration of each entry in the job management table 160 according to this embodiment. The column 161 stores a job name. The job name is used for identifying each entry of the job management table 160. The column 162 stores the job program and data (collectively referred to as job application) used in the job corresponding to the entry. The column 163 stores the selection condition 164 which the computer operating the job application should satisfy. In the selection condition 164, the condition for the hardware information (hardware condition) 170 and the condition for the software information (software information) 180 of the managed computer 200 stored in the configuration management table are paired.

It is possible to store plural pairs of the selection condition 164 for each one job. More specifically, a managed computer having the hardware information and the software information which satisfy the one of the plural pairs of the hardware condition and the software condition stored in the column 163 can properly operate the job application 162 corresponding to the entry.

Figure 8:
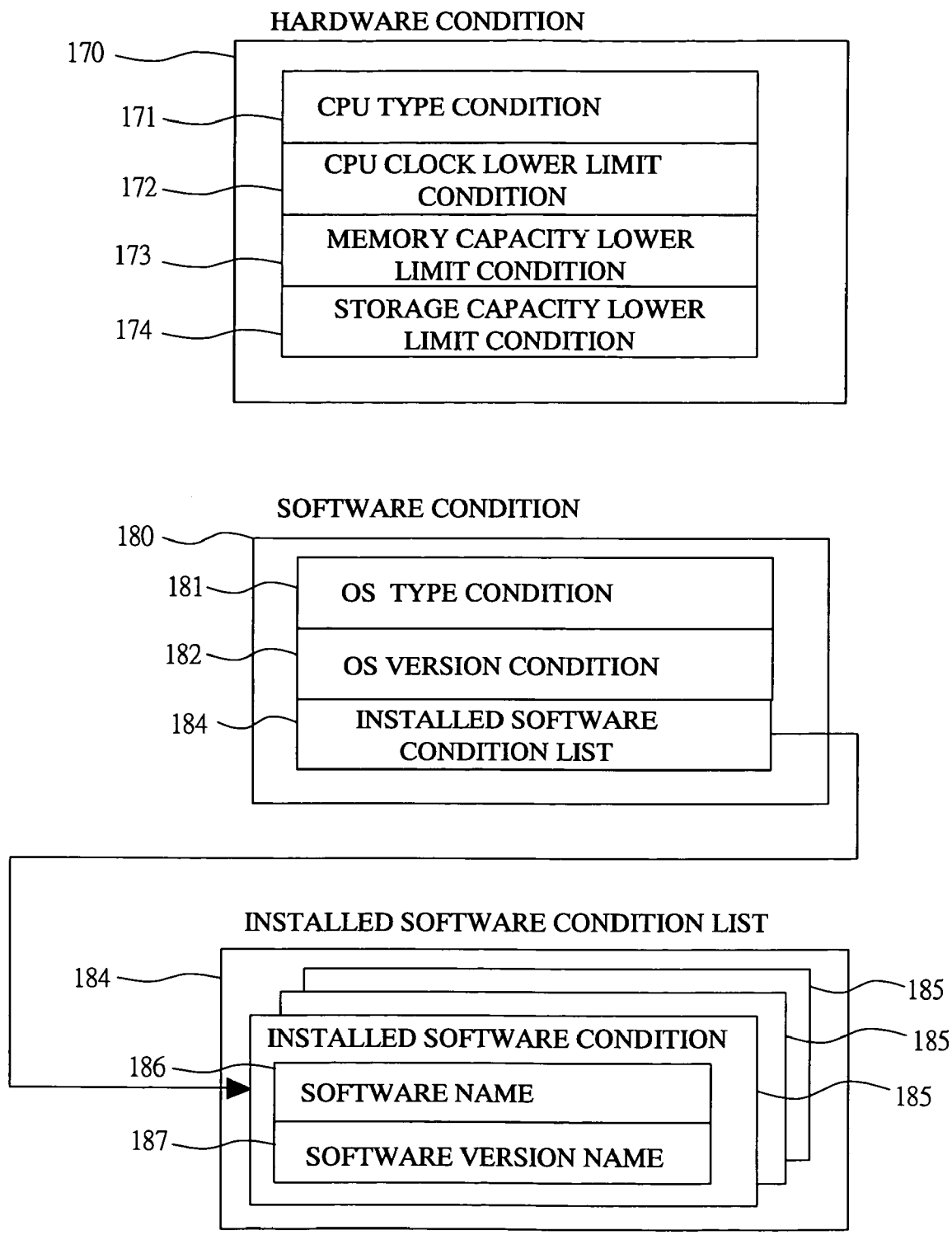
FIG. 8 is a diagram showing the configuration of the hardware condition and the software condition in the job information table 160 according to the first embodiment.

FIG. 8 is a diagram showing the configuration of the hardware condition 170 and the software condition 180 in the job table 160. The hardware condition 170 is comprised of a CPU type condition 171, a CPU clock lower limit condition 172, a memory capacity lower limit condition 173, and a storage capacity lower limit condition 174. In the CPU type condition 171, a CPU type or a plurality of CPU types capable of operating the job application 162 are listed. The software condition 180 is comprised of an OS type condition 181, an OS version condition 182, and an installed software condition list 184. The OS type condition 181 and the OS version condition 182 are the OS type and the OS version name of the managed computer 200 which can operate the job application 162. A plurality of OS version names are provided for one OS type in some cases.

In the installed software condition list 184, pairs of a software name 186 and a version name 187 of all softwares which need to be installed in order to execute the job application 162 are listed, and are determined in accordance with the OS type condition.

If any of the plurality of OS types can operate the job application 162, the OS version condition and the installed software condition list are registered to each of the plurality of OS types.

FIGS. 9 to 17 are flowcharts showing various processes according to this embodiment.

Figure 9:
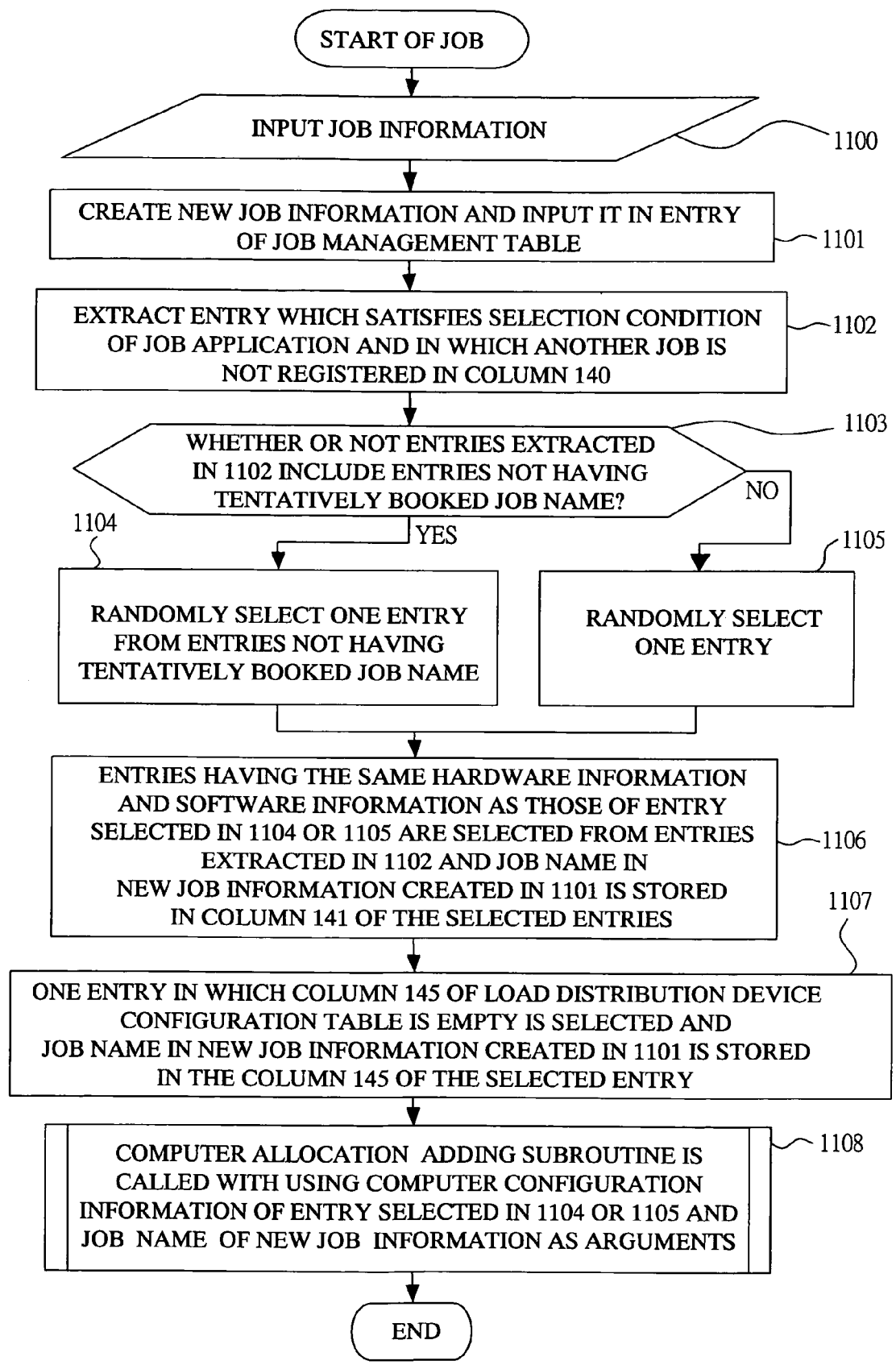
FIG. 9 is a flowchart showing the process of starting the new job executed in the first embodiment.

FIG. 9 shows the process of starting the job. This process is activated by the manager request 108. In Step 1100, the manager inputs the job information for the job operated by using the managed computers 200 in the data center 1.

Steps 1101 to 1105 and Step 1107 are performed by the job start resource selection program 105 (FIG. 3) of the provisioning system 110. In Step 1101, new job information is created based on the job information inputted in Step 1100, and is stored in the job management table 160 in the job information storing region 115. In Step 1102, the entry in which the hardware information and the software information in the columns 120 and 130 satisfy any of the selection conditions 164 in the new job information created in Step 1101 and the column 140 is empty is extracted by searching through the computer configuration table 113. The step described above corresponds to the extraction of a computer group to be allocated to the new job. In Step 1103, it is checked whether or not an entry in which the tentatively booked job name is not present in the column 141 exists in the entries extracted in Step 1102. If it exists, the process advances to Step 1104 and if it does not, the process advances to Step 1105. In Step 1104, one entry is randomly selected from the entries extracted in Step 1102 in which the column 141 is empty, and the managed computer corresponding to the entry is set as the computer allocated to the new job. In Step 1105, one entry is randomly selected from the entries extracted in Step 1102, and the managed computer corresponding to the entry is set as the computer allocated to the job. That is, when selecting the computer allocated to a job, the computer tentatively booked to the job is selected with priority.

Step 1106 is performed by the tentative booking program 104. In Step 1106, an entry having the same hardware information and software information as those of the entry selected in Step 1104 or 1105 is selected from the entries extracted in Step 1102, and the job name of the new job information created in Step 1101 is stored in the column 141 of the respective entries. That is, the computer having the same hardware information and software information as those of the computer to which the new job is allocated is tentatively booked to the job.

Step 1107 is performed by the load distribution resource selection program 107. In Step 1107, one entry in which the column 145 of the load distribution device configuration table 114 is empty is randomly selected, and the job name 161 in the new job information created in Step 1101 is stored in the column as the name of the job.

In Step 1108, a computer allocation adding subroutine of the provisioning program 103 is called with using the computer configuration information of the entry selected in Step 1104 or Step 1105 and the job name of the new job information created in Step 1101 as arguments.

Figure 10:
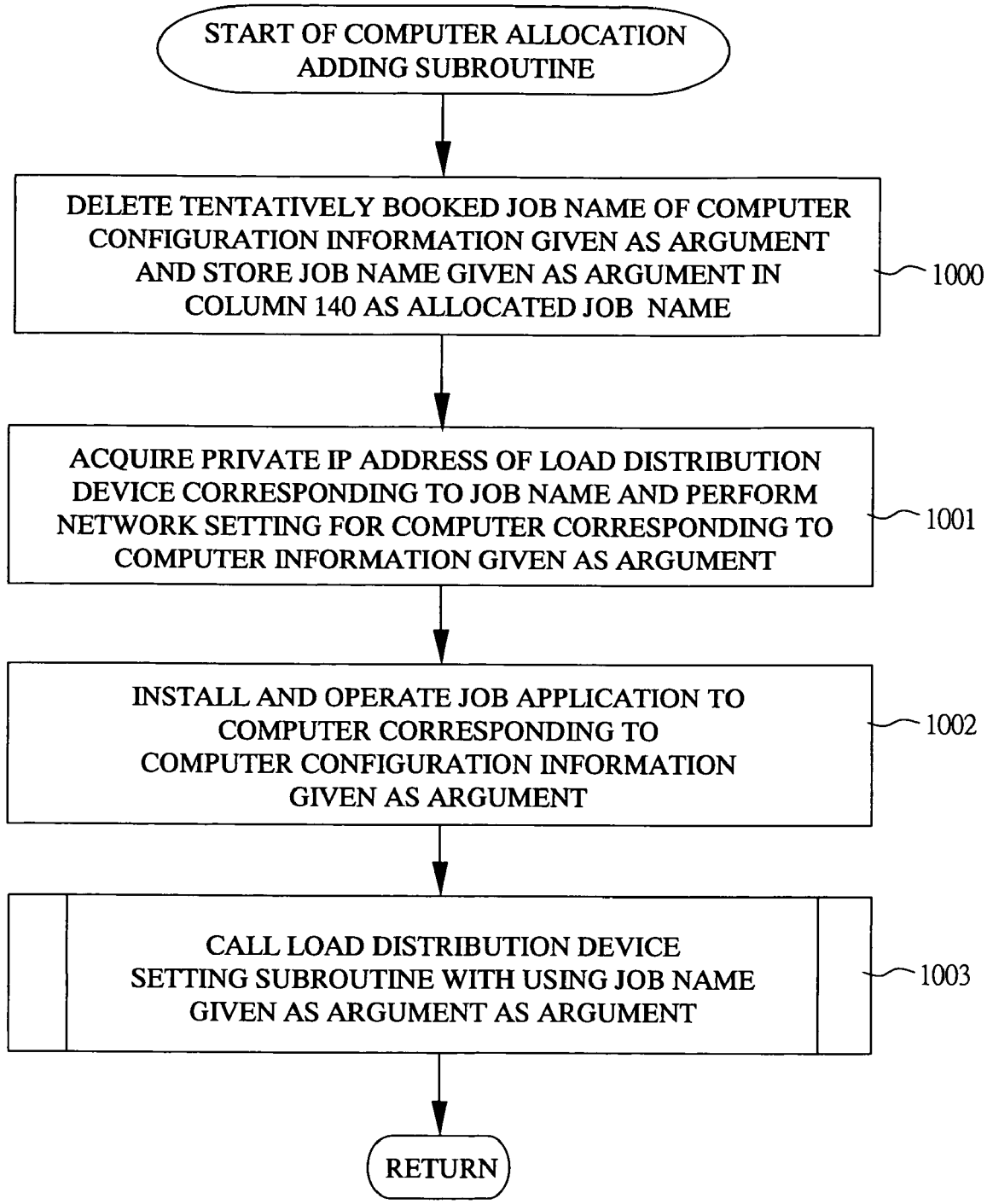
FIG. 10 is a flowchart showing a computer allocation adding subroutine according to the first embodiment.

FIG. 10 shows the process of the computer allocation adding subroutine of the provisioning program 103. This process is performed when the computer configuration information of the computer to be additionally allocated to a job and the job name thereof are given as arguments from other process. In Step 1000, the tentatively booked job names registered in the column 141 of the entry corresponding to the computer name given as an argument in the computer configuration table 113 are all deleted, and the job name given as an argument is stored in the column 140 of the entry. In Step 1001, the entry having the same allocated job name as the job name given as an argument is selected from the load distribution device configuration table 113, and the private IP address of the column 144 of the entry is acquired. Then, the network setting for the managed computer 200 corresponding to the computer name is performed via the agent program 201 operated on the managed computer 200 so that the default gateway becomes the acquired private IP address 144. In Step 1002, the entry in which the job name given as an argument is registered in the column 161 is extracted by searching through the job management table 160, and the job application of the column 162 of the entry is acquired. Then, the job application is installed and operated in the managed computer 200 via the agent program 201 operated on the managed computer 200 corresponding to the computer name given as an argument. In Step 1003, a load distribution device setting subroutine shown in FIG. 12 is called with using the job name given as an argument as an argument.

Figure 11:
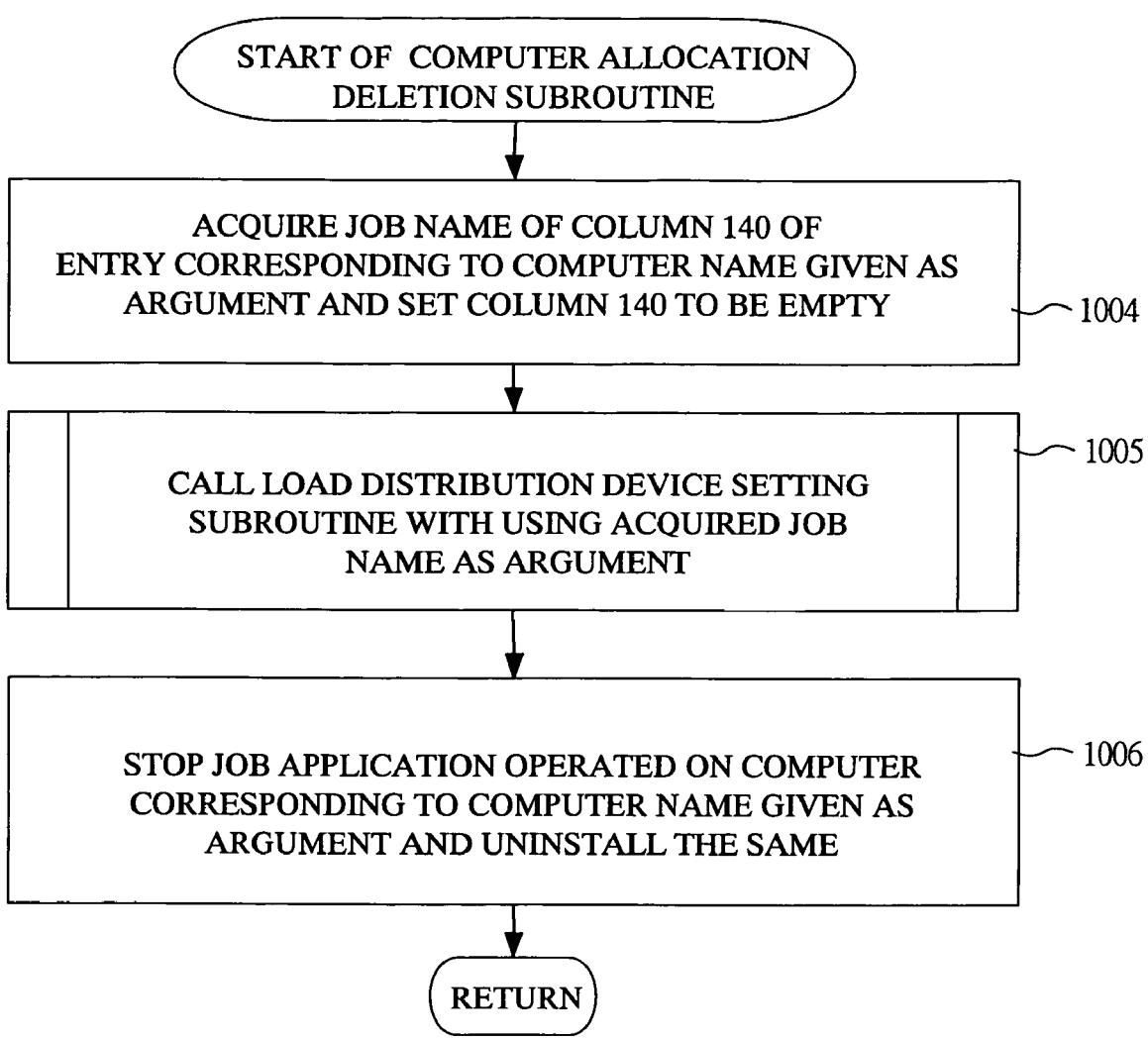
FIG. 11 is a flowchart showing a computer allocation deletion subroutine according to the first embodiment.

FIG. 11 shows the process of a computer allocation deletion subroutine of the provisioning program 103. This process is performed when the name of the computer to be deleted is given as an argument from other process. In Step 1004, the allocated job name of the column 140 of the entry corresponding to the given computer name of the computer configuration table is acquired, and the column 140 is set to be empty. In Step 1005, a setting subroutine of the load distribution device shown in FIG. 12 is called with using the allocated job name acquired in Step 1004 as an argument. In Step 1006, the job application operated on the managed computer 200 is stopped and uninstalled via the agent program 201 operated on the managed computer corresponding to the computer name.

Figure 12:
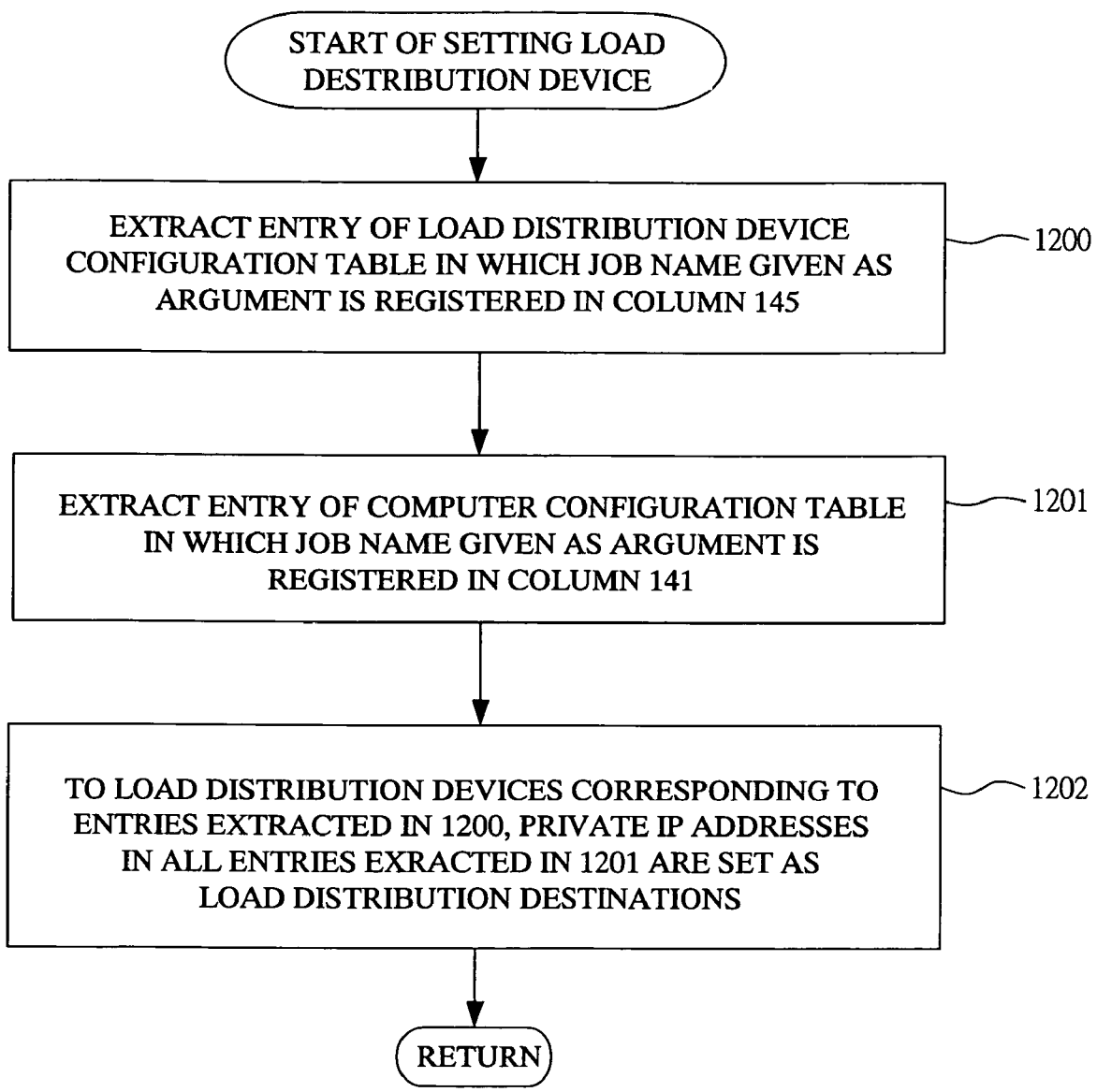
FIG. 12 is a flowchart showing a load distribution device setting subroutine according to the first embodiment.

FIG. 12 shows the process of a load distribution device setting subroutine of the provisioning program 103. This process is performed when the job name is given as an argument from other process. In Step 1200, the entry in which the allocated job name which is the same as the job name given as an argument is registered in the column 145 is extracted by searching through the load distribution device configuration table 114. In Step 1201, all of the entries in which the allocated job name which is the same as the given job name is registered in the column 141 are extracted by searching through the computer configuration table 113. In Step 1202, all of the private IP addresses registered in the column 119 of the entries extracted in Step 1201 are acquired, and the private IP addresses are sequentially set as the load distribution destinations to the load distribution device 310 corresponding to the entry extracted in Step 1200.

Figure 13:
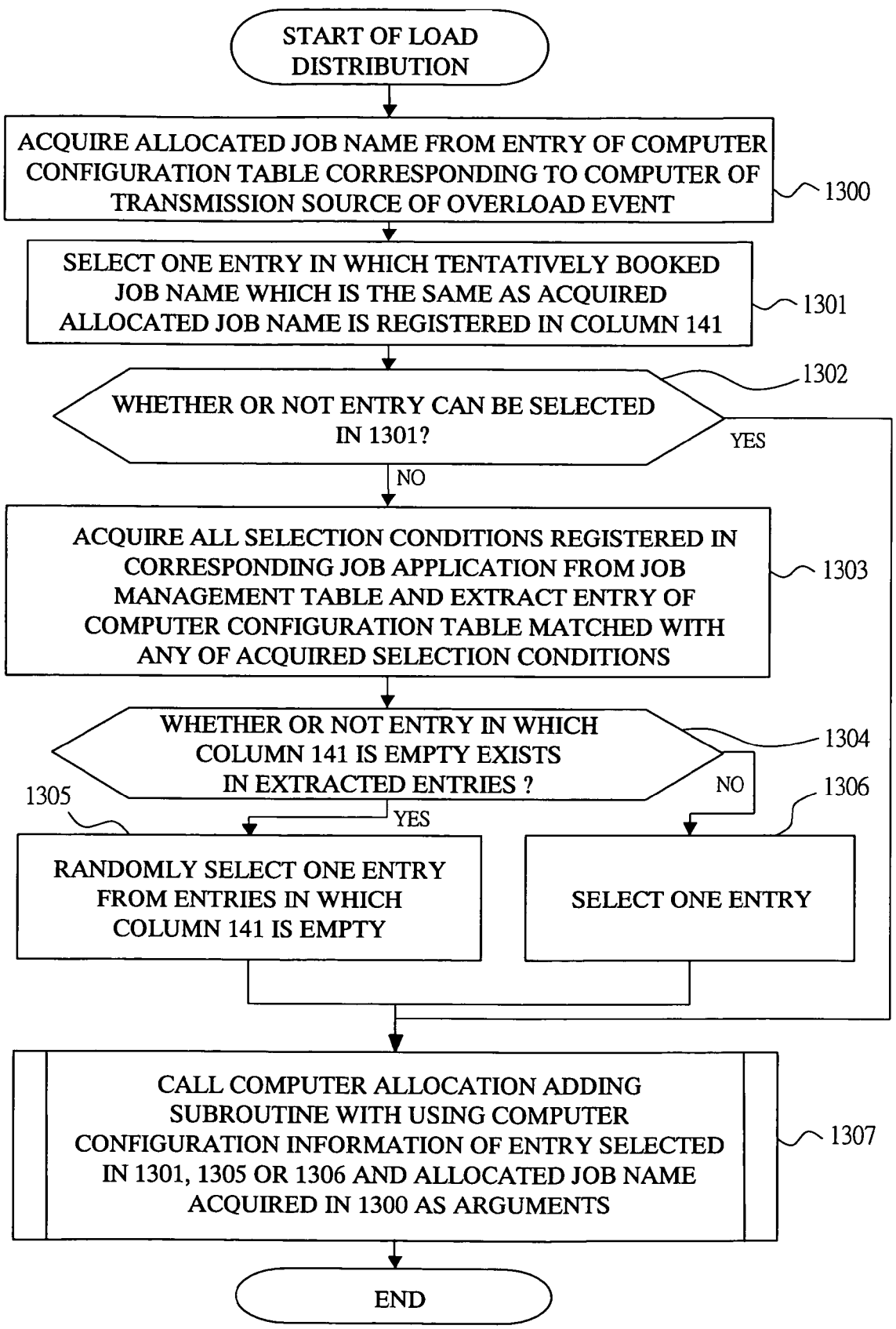
FIG. 13 is a flowchart showing the process of a load distribution resource selection program according to the first embodiment.

FIG. 13 shows the process of the load distribution resource selection program 107. This process is activated by the overload event 109. In Step 1300, the entry corresponding to the managed computer 200 serving as a transmission source of the overload event 109 of the computer configuration table 113 is selected, and the allocated job name 140 registered in the column 140 is acquired. In Step 1301, one entry in which the tentatively booked job name which is the same as the allocated job name acquired in Step 1300 is included in the column 141 is randomly selected by searching through the computer configuration table 113. In Step 1302, the process advances to Step 1307 when the entry can be selected in Step 1301, and advances to Step 1303 when it cannot be selected. In Step 1303, the entry in which the job name which is the same as the allocated job name selected in Step 1300 is included in the column 161 is selected from the job management table 160, and all of the selection conditions 164 registered in the corresponding columns are acquired, and then, the entry in which the hardware information and the software information in the columns 120 and 130 are matched with any of the acquired selection condition 164 and the column 140 is empty is extracted from the computer configuration table 113. In Step 1304, it is checked whether or not an entry in which the column 141 is empty, that is, the tentatively booked job name is not registered in the column 141 exists in the entries extracted in Step 1301. If it exists, one entry is randomly selected from these entries in Step 1305. If there is no entry in which the column 141 is empty in Step 1304, the process advances to Step 1306, and one entry is randomly selected from all of the entries extracted in Step 1303.

As shown in the above-described flows, from the computers which are not used for any job currently, one computer in which the job operated by the computer which issues the overload event is registered as the tentatively booked job is selected first, and one computer in which no job is registered as the tentatively booked job is selected second. In Step 1307, the computer allocation adding subroutine shown in FIG. 10 is called with using the computer configuration information of the computer selected in this manner and the allocated job name acquired in Step 1300 as arguments.

Figure 14:
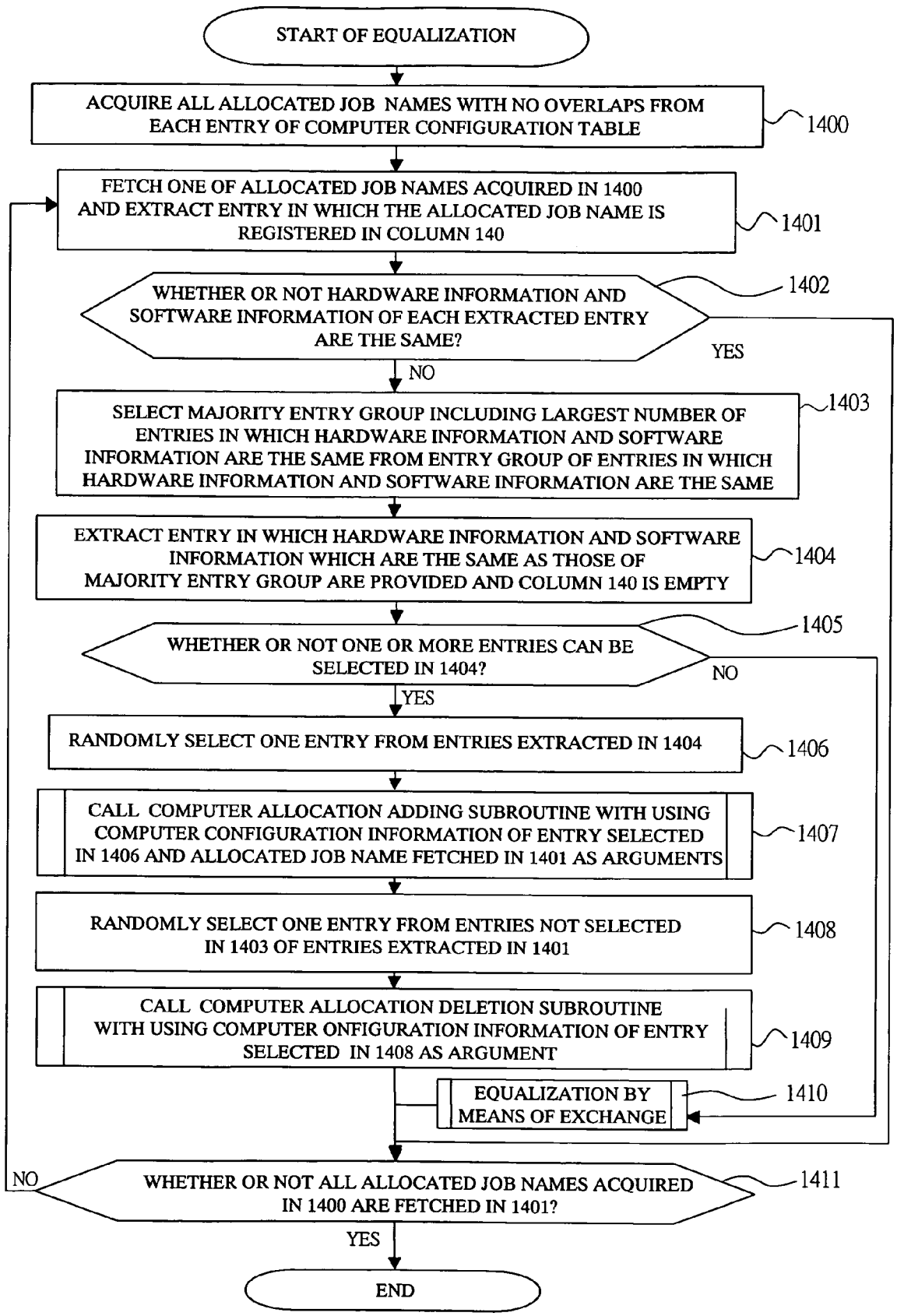
FIG. 14 is a flowchart showing the process of the resource equalization program according to the first embodiment.

FIG. 14 shows the process of the resource equalization program 102. This process is activated regularly by the timer 101. In Step 1400, all of the job names registered in column 140 are acquired with no overlaps from each of the entries of the computer configuration table 113. In Step 1401, one allocated job name is fetched from all of the allocated job names acquired in Step 1400, and the entry in which the allocated job name which is the same as the allocated job name fetched by searching through the computer configuration table 113 is included in the column 140 is extracted. In step 1402, it is checked whether or not the hardware information and the software information of the columns 120 and 130 of all entries extracted in Step 1401 are the same. If all of them are the same, the process advances to Step 1411 for the resource equalization process of the next allocated job name. If there is the different information, the process advances to Step 1403. In Step 1403, a majority entry group including the largest number of entries each having the same hardware information and software information is selected from the groups of the entries acquired in Step 1401 and having the same hardware information and software information of the columns 120 and 130. When there are a plurality of entry groups including the largest number of entries each having the same hardware information and software information, one of the entry groups is selected as the majority entry group. In Step 1404, the entry in which the hardware information and the software information matched with the hardware information and the software information of the majority entry group selected in Step 1403 are provided in the columns 120 and 130 and the column 140 is empty is extracted by searching through the computer configuration table 113. These entries are the candidates of the computers to be additionally allocated to the job. In Step 1405, it is checked whether or not one or more entries (candidates of additionally allocated computers) are extracted in Step 1404. If one or more entries cannot be extracted, the process advances to Step 1410 for performing the equalization process by means of exchange described later in detail with reference to FIG. 15. If one or more entries can be extracted, the process advances to Step 1406. In Step 1406, one entry is randomly selected from the entries extracted in Step 1404, and the computer corresponding to the selected entry is set as the additionally allocated computer. In Step 1407, the computer allocation adding subroutine shown in FIG. 10 is called with using the computer configuration information selected in Step 1406 and the allocated job name 140 fetched in Step 1401 as arguments.

In Step 1408, one of the entries not selected in Step 1403 of the entries acquired in Step 1401 is randomly selected. In Step 1409, the computer allocation deletion subroutine shown in FIG. 11 is called with using the computer configuration information of the entry selected in Step 1408 as an argument.

In Step 1411, it is checked whether or not all of the allocated job name groups 140 acquired in Step 1400 are fetched in the process of Step 1401. If there is the name groups not fetched yet, the process returns to Step 1401, and if all of the names are already fetched, the process is finished.

FIG. 15 shows the equalization process by means of exchange which is called as a subroutine from the process of the resource equalization shown in FIG. 14. In Step 1500, the entry in which the hardware information and the software information which are the same as the hardware information and the software information of the majority entry group selected in Step 1403 of FIG. 14 are provided in the columns 120 and 130 and the job name different from the allocated job name fetched in Step 1401 is registered in the column 141 is extracted by searching through the computer configuration table 113. In Step 1501, all of the allocated job names registered in column 141 are acquired with no overlaps from each of the entries extracted in Step 1500. In Step 1502, one allocated job name is fetched from the allocated job names acquired in Step 1501, and the entry in which the allocated job name which is the same as the allocated job names fetched is provided is extracted by searching through the computer configuration table 113.

In Step 1503, a majority entry group including the largest number of entries each having the same hardware information and software information is selected from the groups of the entries acquired in Step 1502 and having the same hardware information and software information in the columns 120 and 130. When there are a plurality of entry groups including the largest number of entries each having the same hardware information and software information, one of the entry groups is selected as the majority entry group. In Step 1504, it is checked whether or not the hardware information and the software information of the majority entry group selected in Step 1403 are the same as the hardware information and the software information of the majority entry group selected in Step 1503, and when they are the same, the process advances to Step 1508 for extracting the candidates for the exchange from the computers used for a different job.

When the software information and the hardware information are different in Step 1504, the process advances to Step 1505. In Step 1505, the entry in which the hardware information and the software information of the columns 120 and 130 are the same as the hardware information and the software information of the majority entry group extracted in Step 1503 is searched from the entry groups extracted in Step 1401. When there is the entry having the same hardware information and software information, the computer corresponding to the entry is not included in the majority having the same spec in the computer group to which the same job as that of the computer is allocated, and the computer has the same spec as that of the computers of the majority in the computer group used for the job selected in Step 1401 in FIG. 14. Therefore, the equalization of the computer spec can be realized by mutually exchanging the job allocations. For this purpose, the computer allocation exchange process described later with reference to FIG. 16 is called in Step 1507. In Step 1505, when there is no entry having the same hardware information and software information as those of the majority entry of Step 1401, the process advances to Step 1508 for extracting the candidate for the exchange from the computers used for a different job.

In Step 1508, it is checked whether or not all of the allocated job name groups 140 acquired in Step 1501 are fetched in the process of Step 1502. If there is the name not fetched yet, the process advances to Step 1502, and if all of the names are already fetched, it returns to the source of the call.

FIG. 16 shows the computer allocation exchange process of Step 1507 in FIG. 15 in detail. In Step 1600, one entry in which the hardware information and the software information of the columns 120 and 130 are the same as the hardware information and the software information of the majority entry selected in Step 1503 is randomly selected from the entries in the computer configuration table 113 extracted in Step 1401.

In Step 1601, one entry in which the hardware information and the software information of the columns 120 and 130 are the same as the hardware information and the software information of the majority entry group selected in Step 1403 is randomly selected from the entries extracted in Step 1502.

In Step 1602, the computer allocation deletion subroutine shown in FIG. 11 is called with using the computer configuration information of the entry selected in Step 1600 as an argument. In Step 1603, the computer allocation deletion subroutine is called with using the computer configuration information of the entry selected in Step 1601 as an argument. In Step 1604, the adding subroutine of the computer used for the job shown in FIG. 10 is called with using the computer configuration information of the entry selected in Step 1601 and the allocated job name fetched in Step 1401 as arguments. In Step 1605, the computer allocation adding subroutine is called with using the computer configuration information of the entry selected in Step 1600 and the allocated job name fetched in Step 1502 as arguments.

FIG. 17 shows the process of the job finish program 106. This process is activated by the manager request 108. In Step 1700, the manager inputs the name of the job to be finished. In Step 1701, the entries in which the allocated job name which is the same as the job name inputted in Step 1700 is provided in the column 141 are extracted by searching through the computer configuration table 113. In Step 1702, one entry is fetched from the entries extracted in Step 1701. In Step 1703, the computer allocation deletion subroutine shown in FIG. 11 is called with using the computer configuration management information of the entry fetched in Step 1702 as an argument. In Step 1704, it is checked whether or not all of the entries selected in Step 1701 are fetched in the process of Step 1702. If there is the entry not fetched yet, the process advances to Step 1702, and if all of the entries are already fetched, the process advances to Step 1705. In Step 1705, the entry in which the allocated job name which is the same as the job name inputted in Step 1700 is provided in the column 145 is extracted by searching through the load distribution device configuration table 114, and the column 145 of the entry is set to be empty. In Step 1706, the entry in which the tentatively booked job name which is the same as the job name inputted in Step 1700 is registered in the column 141 is extracted from the computer configuration table 113, and the tentatively booked job name of each entry which is the same as the job name inputted in Step 1700 is deleted. In Step 1707, the entries in the job management table 160 in which the job name which is the same as the job name inputted in Step 1700 is provided in the column 161 are deleted. According to the embodiment described above, the equalization of computer resource group used for each job can be achieved.

Second Embodiment

The second embodiment of the present invention obtained by partly modifying the first embodiment will be described below.

In the provisioning system of the second embodiment, an equalization spec conversion information storing region 190 shown in FIG. 18 is additionally provided to the provisioning system of the first embodiment (FIG. 3).

In the equalization spec conversion information storing region 190, a plurality of equalization spec conversion information 191 are registered. Of the pairs of the hardware information and the software information in the managed computers comprised of the items shown in FIG. 6, the hardware information and the software information including the items which require the definition of the range regarded as the same spec are registered in each of the equalization spec conversion information 191 by the manager of the data center. The hardware condition 192 and the software condition 193 in FIG. 18 are the hardware information and the software information including the items which require the definition of the range regarded as the same spec. The hardware condition 195 and the software information 196 in the equalization spec conversion 194 corresponding to them have the same configuration as those of the hardware condition 170 and the software condition 180 shown in FIG. 8. More specifically, each of the items of the hardware condition 195 and the software condition 196 represents a certain range such as a plurality of names of CPU type and OS type, a plurality of version names, and a lower limit of the memory capacity. In this embodiment, the equalization spec conversion information storing region 190 is referenced when selecting the manage computer in which the tentatively booked job name shown in Step 1106 of FIG. 9 is registered. More specifically, in Step 1106, the hardware information and the software information of the managed computer to which the new job determined in Step 1104 or Step 1105 is allocated are acquired, and it is checked whether the equalization spec conversion information 191 having the hardware condition 192 and the software condition 193 matched with the acquired hardware condition and software condition is registered or not by searching through the equalization spec conversion information storing region 190. When it is registered, the entry which satisfies the items of the corresponding hardware condition 195 and software condition 196 is extracted from the entries in the computer configuration table 113 extracted in Step 1102, and the tentatively booked job name is registered in the column 141 of the entry extracted in this manner.

Furthermore, in this embodiment, the equalization spec conversion information storing region 190 is referenced also in the process steps of, for example, the selection of the majority computer group each having the same hardware information and software information shown in Step 1403 of FIG. 14, the extraction of the candidate of the computer to be provided, which have the hardware information and the software information matched with the hardware information and the software information of the majority computer group shown in Step 1404 of FIG. 14, the extraction of the computer group to be the candidate for exchange having the same hardware information and software information as those of the majority computer group shown in Step 1500 of FIG. 15, the selection of the majority computer group in the computer group used for the job of the candidate for exchange shown in Step 1503 of FIG. 15, and the selection of the computer for exchanging the job shown in Step 1505 of FIG. 15. That is, instead of the hardware information and the software information themselves of the computer serving as the comparison standards, the hardware condition 195 and the software condition 196 registered in the equalization spec conversion information storing region 190 are used as the comparison standards in the extraction of the computer having the same spec as a certain computer or the determination of the same spec.

Third Embodiment

In the third embodiment, an equalization process execution flag 165 is added to the entry corresponding to each job name of the job management table 160 described in the first embodiment (FIG. 7). The equalization process execution flag 165 shows whether or not the corresponding job is the job to which the equalization processing of FIG. 14 is executed. In the equalization processing of the first embodiment described with reference to FIG. 14, the range of the job name acquired in the process of acquiring the job name in Step 1400 is changed. More specifically, only the job name corresponding to the entry whose equalization process execution flag 165 is set to "true" is acquired, and the job name of the entry whose equalization process execution flag 165 is set to "false" is not acquired. In this embodiment, it is possible to specify whether or not the equalization process shown in FIG. 14 is executed for each job.

Fourth Embodiment

In the fourth embodiment, an equalization process execution flag 166 is added to the entry corresponding to each job name of the job management table 160 described in the first embodiment (FIG. 7). The equalization process execution flag 166 shows whether or not the corresponding job is the job to which the equalization processing by means of exchange of FIG. 15 is executed.

A step is added before Step 1500 for the equalization by means of exchange shown in FIG. 15. In this step, the job information of the entry in which the same job name as that given as an argument is registered in the column 161 is acquired from the job management table 160, and when the equalization process execution flag 166 of the corresponding entry is "false", the process returns. Also, Step 1501 of FIG. 15 is changed so that the job whose equalization process execution flag 166 is "false" is not acquired as the allocated job name. According to the present invention, it becomes possible to specify whether or not the equalization process by means of exchange is executed for each job.

Fifth Embodiment

In the fifth embodiment, a simultaneous switching process shown in FIG. 19 is used instead of the resource equalization process shown in FIGS. 14 and 15.

The simultaneous switching process shown in FIG. 19 is activated regularly by the timer 101. In Step 1800, all of the allocated job names of the column 141 are acquired with no overlaps from each of the entries of the computer configuration table 113.

In Step 1801, one of the allocated job names acquired in Step 1800 is fetched and the entry in which the same allocated job name as the fetched allocated job name is provided in the column 140 is extracted by searching through the computer configuration table 113.

In Step 1802, it is checked whether or not the hardware information and the software information in the columns 120 and 130 are the same in all of the entries extracted in Step 1801, and when they are the same, the process advances to Step 1810. When either of the hardware information or the software information is not the same, the process advances to Step 1803. In Step 1803, the entry in which the hardware information and the software information in the columns 120 and 130 satisfy any of the selection conditions 164 (FIG. 7) corresponding to the job name fetched in Step 1801 and the allocated job name in the column 140 is empty is extracted from the entries of the computer configuration table 113.

In Step 1804, groups of the entries each having the same hardware information and the software information are formed from the entries extracted in Step 1803. In Step 1805, a group including a number of entries more than the entries extracted in Step 1801 is selected from the plurality of groups created in Step 1804. In Step 1806, it is checked whether or not one or more groups can be selected in Step 1805, and when selected, the process advances to Step 1807, and when not selected, the process advances to Step 1810.

In Step 1807, one group is randomly selected from the plurality of groups selected in Step 1805, and a number of entries as many as the entries extracted in Step 1801 are randomly selected from the selected one group.

In Step 1808, one entry is fetched from the entries selected in Step 1807, and the computer allocation adding subroutine shown in FIG. 10 is called with using the computer configuration information registered in the entry and the allocated job name fetched in Step 1801 as arguments. The subroutine is repeatedly called for all of the entries selected in Step 1807. In Step 1809, one entry is fetched from the entries selected in Step 1801, and the computer allocation deletion subroutine shown in FIG. 11 is called with using the computer configuration information of the fetched entry as an argument. The adding subroutine is repeatedly called for all of the entries selected in Step 1807.

In Step 1810, it is checked whether or not all of the allocated job names acquired in Step 1800 are fetched in the process of Step 1801, and if there is the name not fetched yet, the process advances to Step 1801, and if all of the names are already fetched, the process is finished.

By the process of the simultaneous switching subroutine described above, if there are a computer group used for a certain job and a computer group not used for any job which includes a number of uniform computers as many as those of the computer group, the job allocated to the computer group is automatically switched to the computer group including the uniform computers.

It is also possible to previously specify whether the simultaneous switching process is applied or not for each job. More specifically, a simultaneous switching flag 167 is added to the entry corresponding to each of the job names in the job management table 160 shown in FIG. 7. Then, the process of acquiring the allocated job name in Step 1800 of FIG. 19 is changed so that the allocated job name of the entry whose simultaneous switching flag 167 is "false" is not acquired and only the allocated job name of the entry whose simultaneous switching flag 167 is "true" is acquired.

What is claimed is:

1. A computer resource management method in a distributed processing system in which a plurality of computer resources in which a plurality of jobs are distributed and operated are connected to management means for managing the plurality of computer resources via a network, said method comprising:

a first step of storing hardware information showing a type of hardware constituting the computer resource and software information showing a type of software existing in the computer resource corresponding to each of the computer resources in a configuration management information storing region managed by said management means in advance;

a second step of extracting a set of computer resources which may be used for a first job in the aftertime from all of the computer resources, said set of computer resources each having the same hardware information and software information;

a third step of registering a name of said first job corresponding to said set of extracted computer resources in said configuration management information storing region, allowing overlaps with other job names; and a fourth step of searching for said name of said first job registered in said configuration management information storing region, thereby selecting the computer resource to be allocated to said first job when it is necessary to additionally allocate one of said plurality of computer resources to said first job.

2. The computer resource management method according to claim 1, wherein said second step is executed after determining the computer resource to which said first job is newly allocated.

3. The computer resource management method according to claim 1 wherein, in said third step, a computer resource corresponding to the name of said first job registered in said configuration management information storing region is selected with priority from the computer resources to which the job can be newly allocated.

4. The computer resource management method according to claim 3, wherein a computer resource corresponding to no other job name that is registered in said configuration management information storing region is selected with priority when the name of said first job is not registered in said configuration management information storing region corresponding to the computer resources to which the job can be newly allocated in said computer configuration table.

5. The computer resource management method according to claim 1, wherein said extracting is based on whether or not said hardware information and said software information satisfy a hardware condition and a software condition defined in advance in accordance with said hardware information and said software information.

6. A computer resource management method in a distributed processing system in which a plurality of computer resources in which a plurality of jobs are distributed and operated are connected to management means for managing the plurality of computer resources via a network, said method comprising:

a first step of storing hardware information showing a type of hardware constituting the computer resource and software information showing a type of software existing in the computer resource in advance in each entry corresponding to each of said plurality of computer resources of a computer configuration table provided in a configuration management information storing region managed by said management means;

a second step of selecting a group including a plurality of computer resources having the largest number of computer resources each having the same hardware information and software information from all of the computer resources used for a predetermined job by searching through said computer configuration table;

a third step of selecting one computer resource having the same hardware information and software information as those of the plurality of computer resources selected in said second step from computer resources not used for any job; and a fourth step of selecting one computer resource not selected in said second step from all of said computer resources used for the predetermined job, canceling the allocation of the selected computer resource to said predetermined job, and allocating said computer resource selected in said third step to said predetermined job instead.

7. The computer resource management method according to claim 6, wherein said method further comprises: a step of setting a first flag to only the entry corresponding to the job, to which the processes of said second and fourth steps are to be applied, of the entries corresponding to each of said plurality of jobs of the job table provided in a job information storing region managed by said management means, and said second step and said fourth step in which the job corresponding to the entry to which said first flag is set is sequentially employed as said predetermined job are executed.

8. The computer resource management method according to claim 6, wherein determination whether the same hardware information and software information as those of the plurality of computer resources are provided or not in said third step is made based on whether or not said hardware information and said software information satisfy a hardware condition and a software condition defined in advance in accordance with said hardware information and said software information.

9. A computer resource management method in a distributed processing system in which a plurality of computer resources in which a plurality of jobs are distributed and operated are connected to management means for managing the plurality of computer resources via a network, said method comprising:

a first step of storing hardware information showing a type of hardware constituting the computer resource and software information showing a type of software existing in the computer resource in advance in each entry corresponding to each of said plurality of computer resources of a computer configuration table provided in a configuration management information storing region managed by said management means;

a second step of selecting a group including a plurality of computer resources having the largest number of computer resources each having the same hardware information and software information from all of the computer resources used for a first job by searching through said computer configuration table;

a third step of selecting a group including a plurality of computer resources having the largest number of computer resources each having the same hardware information and software information from all of the computer resources used for a second job by searching through said computer configuration table;

a fourth step of selecting a first computer resource to be a candidate for exchange from the computer resources used for said second job and not selected in said third step on condition that the computer resource has the same hardware information and software information as those of the plurality of computer resources selected in said second step;

a fifth step of selecting a second computer resource to be a candidate for exchange from the computer resources used for said first job and not selected in said second step on condition that the computer resource has the same hardware information and software information as those of the plurality of computer resources selected in said third step; and a sixth step of mutually switching allocation of said second job to said first computer resource and allocation of said first job to said second computer resource.

10. The computer resource management method according to claim 9, wherein said method further comprises: a step of setting a second flag to only the entry corresponding to the job, to which the processes of said second and sixth steps are to be applied, of the entries corresponding to each of said plurality of jobs of the job table provided in a job information storing region managed by said management means, and said second step and said sixth step in which the job corresponding to the entry to which said second flag is set is employed as said first and second jobs are executed.

11. The computer resource management method according to claim 9,
wherein determination whether the same hardware information and software information as those of the plurality of computer resources are provided or not in said fifth step is made based on whether or not said hardware information and said software information satisfy a hardware condition and a software condition defined in advance in accordance with said hardware information and said software information.

12. A computer resource management method in a distributed processing system in which a plurality of computer resources in which a plurality of jobs are distributed and operated are connected to management means for managing the plurality of computer resources via a network,
said method comprising:
first step of storing hardware information showing a type of hardware constituting the computer resource and software information showing a type of software existing in the computer resource in advance in each entry corresponding to each of said plurality of computer resources of a computer configuration table provided in a configuration management information storing region managed by said management means;
a second step of selecting a plurality of computer resources as many as the computer resources used for a predetermined job and each having the same hardware information and software information from the computer resources used for said predetermined job and the computer resources not used for any job by searching through said computer configuration table; and
a third step of changing allocation of a job to each computer resource so that said predetermined job is operated only by the plurality of computer resources selected in said second step.

13. The computer resource management method according to claim 12,
wherein said method further comprises: a step of setting a third flag to only the entry corresponding to the job, to which the processes of said second and third steps are executed, of the entries corresponding to each of said plurality of jobs of the job table provided in a job information storing region managed by said management means, and said second step and said third step in which the job corresponding to the entry to which said third flag is set is sequentially employed as said predetermined job are executed.

14. The computer resource management method according to claim 12, wherein said selecting is also based on whether or not said hardware information and said software information satisfy a hardware condition and a software condition defined in advance in accordance with said hardware information and said software information.

* * * * *